(12) United States Patent
Emberling

(10) Patent No.: US 6,933,945 B2
(45) Date of Patent: Aug. 23, 2005

(54) DESIGN FOR A NON-BLOCKING CACHE FOR TEXTURE MAPPING

(75) Inventor: Brian D. Emberling, San Mateo, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 223 days.

(21) Appl. No.: 10/403,838

(22) Filed: Mar. 31, 2003

(65) Prior Publication Data

US 2005/0052449 A1 Mar. 10, 2005

(51) Int. Cl.[7] .................................................. G09G 5/36
(52) U.S. Cl. ........................ 345/557; 345/552; 345/537; 345/531; 345/503; 711/118
(58) Field of Search ................................ 345/503, 531, 345/536, 537, 552, 557, 564; 711/118, 133, 137

(56) References Cited

U.S. PATENT DOCUMENTS

| | | | |
|---|---|---|---|
| 5,671,444 A | * 9/1997 | Akkary et al. ................. 710/52 |
| 5,831,640 A | * 11/1998 | Wang et al. ................. 345/552 |
| 6,085,292 A | 7/2000 | McCormack et al. |
| 6,154,814 A | * 11/2000 | Uesugi ........................ 711/133 |
| 6,154,815 A | 11/2000 | Hetherington et al. |
| 6,226,713 B1 | 5/2001 | Mehrotra |
| 6,249,851 B1 | 6/2001 | Richardson et al. |
| 6,269,426 B1 | 7/2001 | Hetherington et al. |
| 6,426,753 B1 | * 7/2002 | Migdal ........................ 345/506 |
| 6,430,654 B1 | * 8/2002 | Mehrotra et al. ............ 711/118 |
| 6,519,682 B2 | 2/2003 | Richardson et al. |
| 6,542,966 B1 | 4/2003 | Crawford et al. |
| 6,643,738 B2 | 11/2003 | Timmer et al. |
| 6,647,463 B2 | 11/2003 | Yamashiroya |
| 6,801,207 B1 | * 10/2004 | Tischler et al. ............. 345/557 |
| 6,825,848 B1 | * 11/2004 | Fu et al. ...................... 345/557 |

* cited by examiner

*Primary Examiner*—Ulka J. Chauhan
(74) *Attorney, Agent, or Firm*—Meyertons Hood Kivlin Kowert & Goetzel, P.C.; Jeffrey C. Hood

(57) ABSTRACT

A non-blocking cache for texture mapping is implemented by separating Cache Tags from Cache Data. Multiple requests for data may be processed in parallel without strict ordering or synchronization. Separating Cache Tags and Cache Data results in a texture memory cache design that preempts stalling which would otherwise occur in case of cache-misses. Multiple Cache Tags with corresponding respective system memory controllers and Data Cache units allow for simultaneous processing of multiple requests without strict ordering. In preferred embodiments the texture memory cache may also be configured to predict cache misses and merge with burst reads from memory, and may equally be configured to minimize memory read-requests necessary during multitexturing, thus maximizing bandwidth.

37 Claims, 19 Drawing Sheets

DESIGN FOR A NON-BLOCKING CACHE FOR TEXTURE MAPPING

BACKGROUND OF THE INVENTION

1. Field of the Invention

This invention relates generally to the field of memory interface design and, more particularly, to cache design in a graphics system.

2. Description of the Related Art

A computer system typically relies upon its graphics system for producing visual output on the computer screen or display device. Early graphics systems were only responsible for taking what the processor produced as output and displaying that output on the screen. In essence, they acted as simple translators or interfaces. Modern graphics systems, however, incorporate graphics processors with a great deal of processing power. They now act more like coprocessors rather than simple translators. This change is due to the recent increase in both the complexity and amount of data being sent to the display device. For example, modern computer displays have many more pixels, greater color depth, and are able to display images that are more complex with higher refresh rates than earlier models. Similarly, the images displayed are now more complex and may involve advanced techniques such as anti-aliasing and texture mapping.

Since graphics systems typically perform only a limited set of functions, they may be customized and therefore far more efficient at graphics operations than the computer's general-purpose central processor. While early graphics systems were limited to performing two-dimensional (2D) graphics, their functionality has increased to support three-dimensional (3D) wire-frame graphics, 3D solids, and now includes support for three-dimensional (3D) graphics with textures and special effects such as advanced shading, fogging, alpha-blending, and specular highlighting.

With each new generation of graphics system, there is more image data to process and less time in which to process it. This consistent increase in data and data rates places additional burden on the memory systems that form an integral part of the graphics system. One example of a memory sub-system defining the upper limit of overall system performance may be the texture buffer of a graphics system. Certain graphics applications such as 3D modeling, virtual reality viewers, and video games may call for the application of an image to a geometric primitive in lieu of a procedurally generated pattern, gradient or solid color. In these applications, geometric primitives carry additional mapping data (e.g., a UV, or UVQ map), which describes how the non-procedural data is to be applied to the primitive. To implement this type of function, a graphics system may employ a texture buffer to store two dimensional image data representative of texture patterns, "environment" maps, "bump" maps, and other types of non-procedural data.

During the rendering process, the mapping data associated with a primitive may be used to interpolate texture map addresses for each pixel in the primitive. The texture map addresses may then be used to retrieve the portion of non-procedural image data in the texture buffer to be applied to the primitive. In some cases (e.g., photo-realistic rendering) a fetch from the texture buffer may result in a neighborhood or tile of texture pixels or texels to be retrieved from the texture buffer and spatially filtered to produce a single texel. In these cases, four or more texels may be retrieved for each displayed pixel, placing a high level of demand on the texture buffer. Thus, poor performance of the texture buffer is capable of affecting a cascading degradation through the graphics system, stalling the render pipeline, and increasing the render or refresh times of displayed images.

In other words, accesses of graphics data, such as texture map data, must be performed very quickly. Therefore, one goal of a graphics system is to improve the speed and efficiency of memory accesses of texture maps from a texture memory. One common method is to use a texture memory cache to improve the speed of accesses of texture maps from the texture memory. The design of texture memory systems, including texture cache memory systems, plays a significant role in the implementation of new generation graphics systems.

Texture mapping hardware often needs to process multiple pixels in the same cycle in order to maximize performance. While these pixels are independent, they typically exhibit some degree of spatial coherence. A high performance texture cache would take advantage of this coherence without imposing ordering or synchronization restrictions between pixels. Texture mapping is generally a read-only operation. Consequently, latency is typically not a factor when considering proper operations, but bandwidth does affect performance. In contrast, the performance of microprocessor instruction and data caches is typically affected by latency, not bandwidth. Again, a high performance texture cache would take advantage of these characteristics. Traditional caches typically look up the Tag and Data for a requested address simultaneously. If a cache miss occurs the data read is annulled, and the pipeline stalls as miss processing takes place, thus decreasing performance considerably.

Therefore, new texture cache memory systems and methods are desired to improve texture access performance. More generally, improved cache memory systems are desired in various different applications, including graphics applications.

SUMMARY

One embodiment of the present invention comprises a system and method for operating a cache memory. An exemplary system may comprise the cache memory coupled to a system memory. In one embodiment, the system is a graphics system, and the cache memory is a texture cache.

The method may comprise receiving a request for data (first data). The requested data has an associated memory address where the data may be stored in the system memory. The requested data may have an associated first cache tag, which may be used to determine if the first data is present in the cache memory. This is preferably performed by including the first tag in the cache memory, and performing a tag lookup in the cache memory.

If the tag lookup in the cache memory results in a cache miss, i.e. the first data is not present in the cache memory, then the cache memory provides a memory request for the first data to system memory. After the cache memory provides the memory request for the first data to system memory, the cache memory remains available to service other read requests. Thus after the cache memory provides the memory request, the cache memory does not stall and may receive a second request for second data. The cache memory may perform a tag lookup to determine whether the second data is present in the cache memory. This tag look up associated with the second data may be performed prior to, or concurrently with the first data being returned from system memory. If the tag lookup is a cache hit, then the second data may also be provided from the cache memory prior to, or concurrently with, the first data being returned from the system memory. In a similar manner, the cache memory may service a plurality of read requests after the memory request is provided for the first data and prior to the first data being returned from the memory.

One embodiment of the invention operates as a texture cache in a graphics system. The graphics system may comprise a system memory, which stores texture data, a texture cache memory coupled to the system memory, and a plurality of bins requesting texture data or texel data, coupled to the texture cache memory. The texture cache memory may cache texture data that is stored in the system memory. In this embodiment, the texture cache memory includes a cache controller and a cache data unit, where the cache controller includes cache tags that may be accessed independently of the cache data unit. The cache tags may be used to determine hit/miss information that indicates if requested data is present in the cache data unit. The cache data unit may be configured to receive the hit/miss information, and to receive texture data from the system memory. In this embodiment, the texture cache memory may further include a FIFO where cache addresses and hit/miss information for each request made for data may be stored. The cache addresses and hit/miss information may be provided to the cache data unit from the FIFO, thus enabling a streaming cache operation.

In other embodiments, a cache-hit may be serviced, including providing cache-hit data from the cache data unit, while a request to system memory for a previous cache-miss is being serviced. The cache tags may also be arranged in parallel and have dedicated memory controllers, with a respective data cache unit corresponding to each cache tag. Thus the cache memory has much more availability than prior systems, while allowing for processing multiple requests for data simultaneously.

BRIEF DESCRIPTION OF THE DRAWINGS

A better understanding of the present invention can be obtained when the following detailed description is considered in conjunction with the following drawings, in which.

Figure 1:
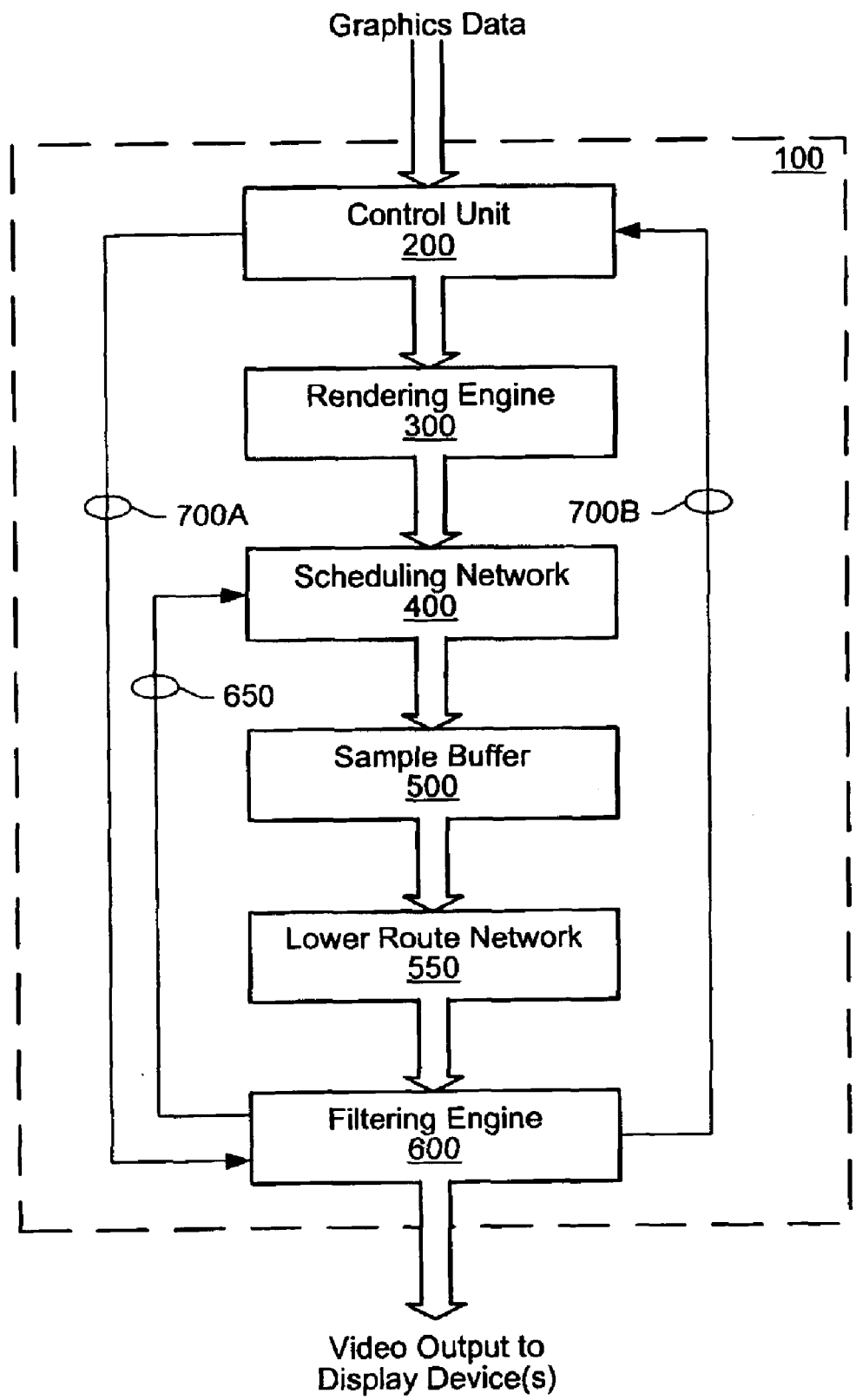
FIG. 1 illustrates one set of embodiments of a graphics accelerator configured to perform graphical computations.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must)." The term "include", and derivations thereof, mean "including, but not limited to". The term "connected" means "directly or indirectly connected", and the term "coupled" means "directly or indirectly connected".

DETAILED DESCRIPTION OF THE PREFERRED EMBODIMENTS

As used herein, "burst length" is used to refer to a number that indicates how many consecutive data bus transfers may be performed in response to a single bus transfer request sent by a host system. For example, if a burst length is four and a memory read operation is performed, there may be four consecutive sets of data transferred on the data bus in response to a single read signal pulse sent by a host system.

The size of a set of data for a single transfer over a data bus is typically commensurate with the size of the data bus. Common burst lengths for a DDR SDRAM may include the values of two, four or eight.

According to prior art, a read operation for a DDR SDRAM may be performed as follows. A DDR SDRAM may receive a Read request through a set of control signals from a requester. A predetermined number of clock cycles after having received the Read request, the DDR SDRAM sends a predetermined number of consecutive strobe signal (DQS) pulses back to the host system. The predetermined number of clock cycles may be referred to as "CAS latency", where CAS stands for "Column Address Strobe". The number of consecutive DQS pulses may be commensurate with one half the value of a predetermined burst length for the read operation. The DDR SDRAM also sends a predetermined number of sets of data to the requester, where the number may be commensurate with the value of the predetermined burst length for the read operation.

FIG. 1 illustrates one set of embodiments of a graphics accelerator 100 configured to perform graphics computations (especially 3D graphics computations). Graphics accelerator 100 may include a control unit 200, a rendering engine 300, a scheduling network 400, a sample buffer 500, a lower route network 550, and a filtering engine 600.

Figure 2:
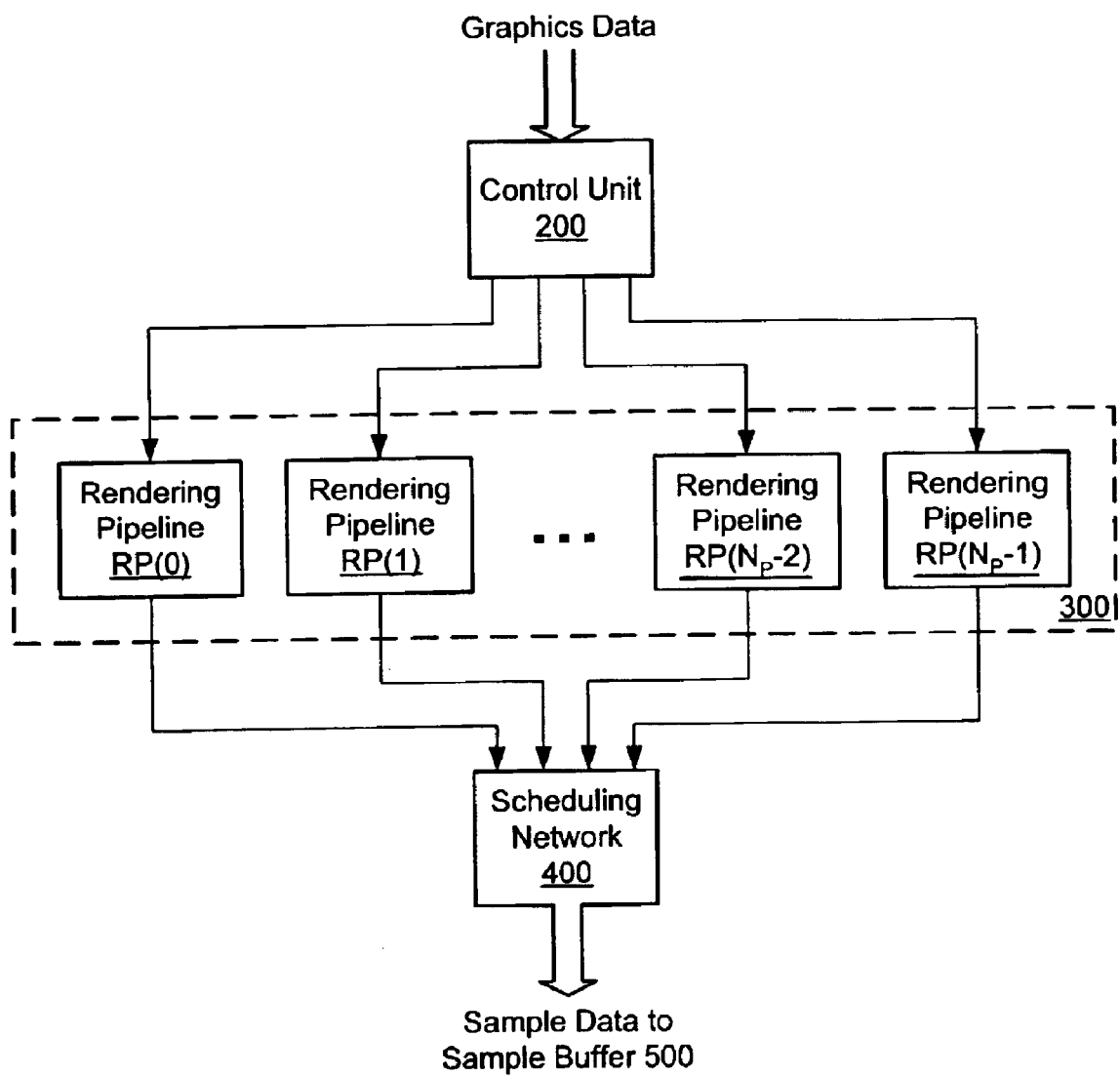
FIG. 2 illustrates one set of embodiments of a parallel rendering engine.

The rendering engine 300 may include a set of $N_{PL}$ rendering pipelines as suggested by FIG. 2, where $N_{PL}$ is a positive integer. The rendering pipelines, denoted as RP(0) through RP($N_{PL}$-1), are configured to operate in parallel. For example, in one embodiment, $N_{PL}$ equals four. In another embodiment, $N_{PL}$=8.

The control unit 200 receives a stream of graphics data from an external source (e.g. from the system memory of a host computer), and controls the distribution of the graphics data to the rendering pipelines. The control unit 200 may divide the graphics data stream into $N_{PL}$ substreams, which flow to the $N_{PL}$ rendering pipelines respectively. The control unit 200 may implement an automatic load-balancing scheme so the host application need not concern itself with load balancing among the multiple rendering pipelines.

The stream of graphics data received by the control unit 200 may correspond to a frame of a 3D animation. The frame may include a number of 3D objects. Each object may be described by a set of primitives such as polygons (e.g. triangles), lines, polylines, dots, etc. Thus, the graphics data stream may contain information defining a set of primitives.

Polygons are naturally described in terms of their vertices. Thus, the graphics data stream may include a stream of vertex instructions. A vertex instruction may specify a position vector (X,Y,Z) for a vertex. The vertex instruction may also include one or more of a color vector, a normal vector and a vector of texture coordinates. The vertex instructions may also include connectivity information, which allows the rendering engine 300 to assemble the vertices into polygons (e.g. triangles).

Each rendering pipeline RP(K) of the rendering engine 300 may receive a corresponding stream of graphics data from the control unit 200, and performs rendering computations on the primitives defined by the graphics data stream. The rendering computations generate samples, which are written into sample buffer 500 through the scheduling network 400.

The filtering engine 600 is configured to read samples from the sample buffer 500, to perform a filtering operation on the samples resulting in the generation of a video pixel stream, and, to convert the video pixel stream into an analog video signal. The analog video signal may be supplied to one or more video output ports for display on one or more display devices (such as computer monitors, projectors, head-mounted displays and televisions).

Furthermore, the graphics system 100 may be configured to generate up to $N_D$ independent video pixel streams denoted VPS(0), VPS(1), ..., VPS($N_D$-1), where $N_D$ is a positive integer. Thus, a set of host applications (running on a host computer) may send $N_D$ graphics data streams denoted GDS(0), GDS(1), ..., GDS($N_D$-1) to the graphics system 100. The rendering engine 300 may perform rendering computations on each graphics data stream GDS(I), for I=0, 1, 2, ..., $N_D$-1, resulting in sample updates to a corresponding region SBR(I) of the sample buffer 500. The filtering engine 600 may operate on the samples from each sample buffer region SBR(I) to generate the corresponding video pixel stream VPS(I). The filtering engine 600 may convert each video pixel stream VPS(I) into a corresponding analog video signal AVS(I). The $N_D$ analog video signals may be supplied to a set of video output ports for display on a corresponding set of display devices. In one embodiment, $N_D$ equals two. In another embodiment, $N_D$ equals four.

The filtering engine 600 may send sample data requests to the scheduling network 400 through a request bus 650. In response to the sample data requests, scheduling network 400 may assert control signals, which invoke the transfer of the requested samples (or groups of samples) to the filtering engine 600.

In various embodiments, the sample buffer 500 includes a plurality of memory units, and the filtering engine 600 includes a plurality of filtering units. The filtering units interface may interface with the lower router network 550 to provide data select signals. The lower route network 550 may use the data select signals to steer data from the memory units to the filtering units.

The control unit 200 may couple to the filtering engine 600 through a communication bus 700, which includes an outgoing segment 700A and a return segment 700B. The outgoing segment 700A may be used to download parameters (e.g. lookup table values) to the filtering engine 600. The return segment 700B may be used as a readback path for the video pixels generated by filtering engine 600. Video pixels transferred to control unit 200 through the return segment 700B may be forwarded to system memory (i.e. the system memory of a host computer), or perhaps, to memory (e.g. texture memory) residing on graphics system 100 or on another graphics accelerator.

The control unit 200 may include direct memory access (DMA) circuitry. The DMA circuitry may be used to facilitate (a) the transfer of graphics data from system memory to the control unit 200, and/or, (b) the transfer of video pixels (received from the filtering engine 600 through the return segment 700B) to any of various destinations (such as the system memory of the host computer).

Figure 3:
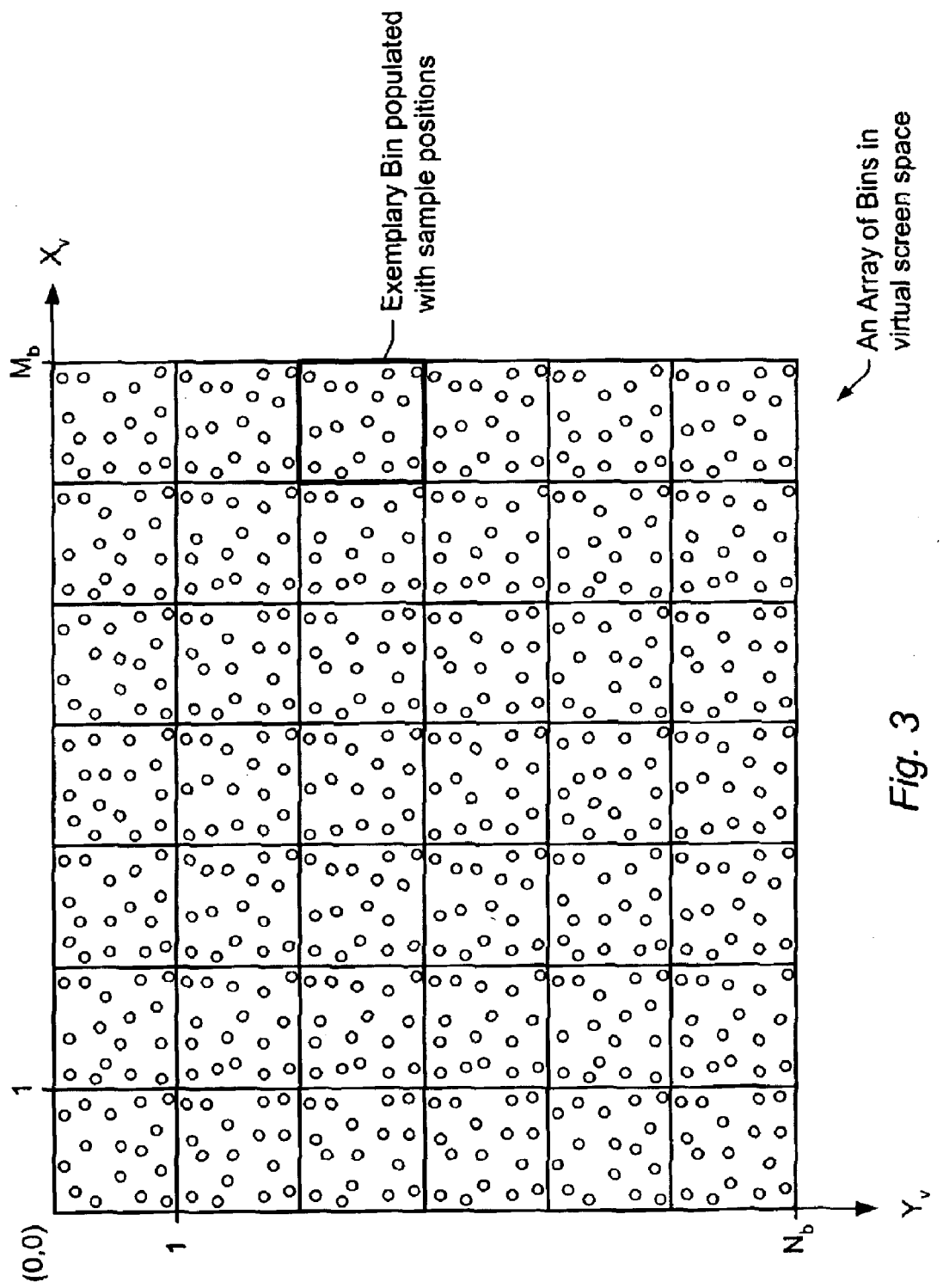
FIG. 3 illustrates an array of spatial bins each populated with a set of sample positions in a two-dimension virtual screen space.

The rendering pipelines of the rendering engine 300 may compute samples for the primitives defined by the received graphics data stream(s). The computation of samples may be organized according to an array of spatial bins as suggested by FIG. 3. The array of spatial bins defines a rectangular window in a virtual screen space. The spatial bin array may have dimension $M_B \times N_B$, i.e., may comprise $M_B$ bins horizontally and $N_B$ bins vertically.

Each spatial bin may be populated with a number of sample positions. Sample positions are denoted as small circles. Each sample position may be defined by a horizontal offset and a vertical offset with respect to the origin of the bin in which it resides. The origin of a bin may be at its top-left corner. Note that any of a variety of other positions on the boundary or in the interior of a bin may serve as its origin. A sample may be computed at each of the sample positions. A sample may include a color vector, and other values such as z depth and transparency (i.e. an alpha value).

The sample buffer 500 may organize the storage of samples according to memory bins. Each memory bin corresponds to one of the spatial bins, and stores the samples for the sample positions in a corresponding spatial bin.

If a rendering pipeline RP(k) determines that a spatial bin intersects with a given primitive (e.g. triangle), the rendering pipeline may:

(a) generate $N_{s/b}$ sample positions in the spatial bin;
(b) determine which of the $N_{s/b}$ sample positions reside interior to the primitive;
(c) compute a sample for each of the interior sample positions, and
(d) forward the computed samples to the scheduling network 400 for transfer to the sample buffer 500.

The computation of a sample at a given sample position may involve computing sample components such as red, green, blue, z, and alpha at the sample position. Each sample component may be computed based on a spatial interpolation of the corresponding components at the vertices of the primitive. For example, a sample's red component may be computed based on a spatial interpolation of the red components at the vertices of the primitive.

In addition, if the primitive is to be textured, one or more texture values may be computed for the intersecting bin. The final color components of a sample may be determined by combining the sample's interpolated color components and the one or more texture values.

Each rendering pipeline RP(K) may include dedicated circuitry for determining if a spatial bin intersects a given primitive, for performing steps (a), (b) and (c), for computing the one or more texture values, and for applying the one or more texture values to the samples.

Each rendering pipeline RP(K) may include programmable registers for the bin array size parameters $M_B$ and $N_B$ and the sample density parameter $N_{s/b}$. In one embodiment, $N_{s/b}$ may take values in the range from 1 to 16 inclusive.

Sample Rendering Methodology

Figure 4:
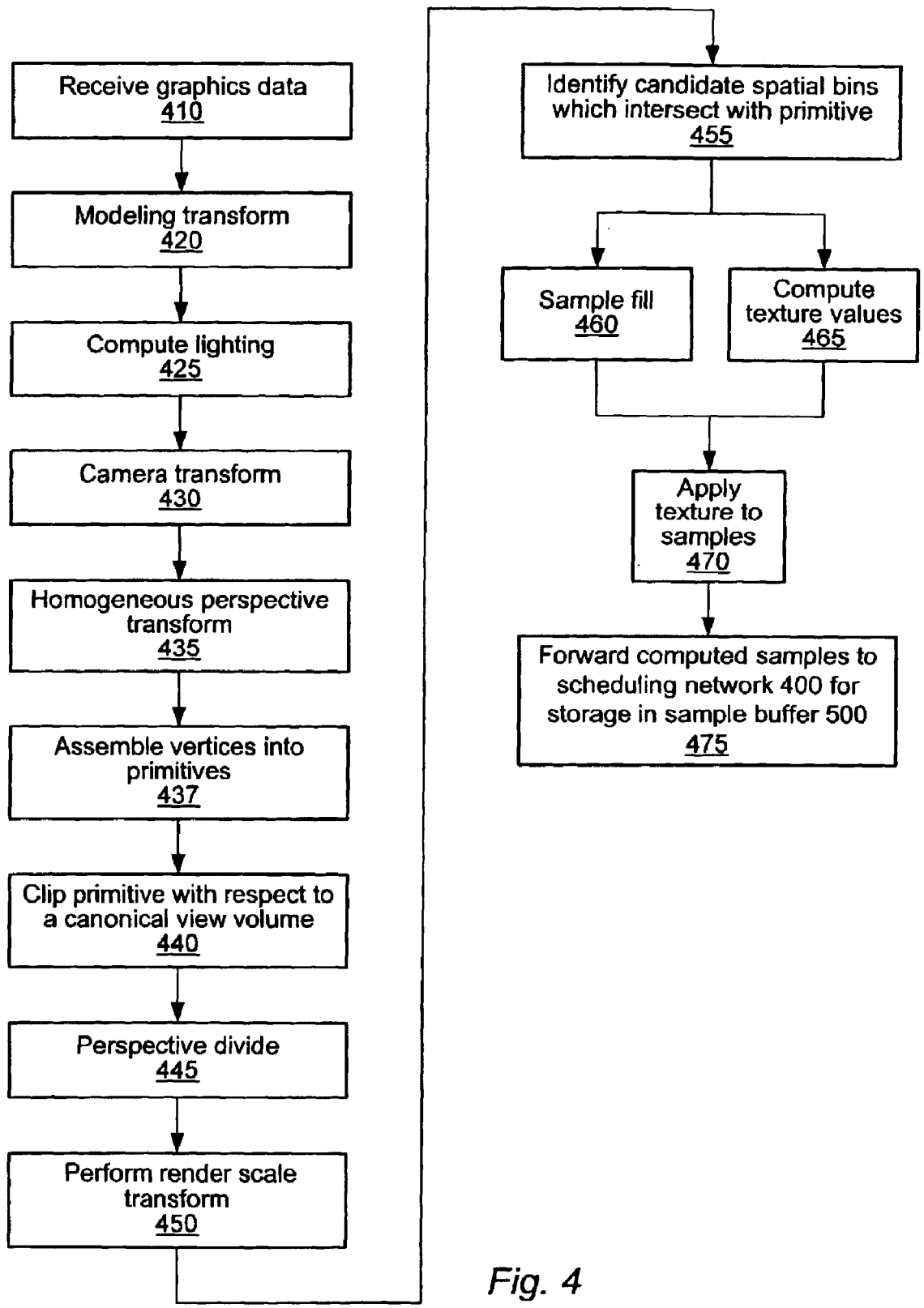
FIG. 4 illustrates one set of embodiments of a rendering methodology which may be used to generate samples in response to received stream of graphics data.

FIG. 4 illustrates one set of embodiments of a rendering process implemented by each rendering pipeline RP(K) of the $N_{PL}$ rendering pipelines.

In step 410, rendering pipeline RP(K) receives a stream of graphics data from the control unit 200 (e.g. stores the graphics data in an input buffer).

The graphics data may have been compressed according to any of a variety of data compression and/or geometry compression techniques. Thus, the rendering pipeline RP(K) may decompress the graphics data to recover a stream of vertices.

In step 420, the rendering pipeline RP(K) may perform a modeling transformation on the stream of vertices. The modeling transformation serves to inject objects into a world coordinate system. The modeling transformation may also include the transformation of any normal vectors associated with the stream vertices. The matrix used to perform the modeling transformation is dynamically programmable by host software.

In step 425, rendering engine 300 may subject the stream vertices to a lighting computation. Lighting intensity values (e.g. color intensity values) may be computed for the vertices of polygonal primitives based on one or more of the following:

(1) the vertex normals;
(2) the position and orientation of a virtual camera in the world coordinate system;
(3) the intensity, position, orientation and type-classification of light sources; and
(4) the material properties of the polygonal primitives such as their intrinsic color values, ambient, diffuse, and/or specular reflection coefficients.

The vertex normals (or changes in normals from one vertex to the next) may be provided as part of the graphics data stream. The rendering pipeline RP(K) may implement any of a wide variety of lighting models. The position and orientation of the virtual camera are dynamically adjustable. Furthermore, the intensity, position, orientation and type-classification of light sources are dynamically adjustable.

It is noted that separate virtual camera positions may be maintained for the viewer's left and right eyes in order to support stereo video. For example, rendering pipeline RP(K) may alternate between the left camera position and the right camera position from one animation frame to the next.

In step 430, the rendering pipeline RP(K) may perform a camera transformation on the vertices of the primitive. The camera transformation may be interpreted as providing the coordinates of the vertices with respect to a camera coordinate system, which is rigidly bound to the virtual camera in the world space. Thus, the camera transformation may require updating whenever the camera position and/or orientation change. The virtual camera position and/or orientation may be controlled by user actions such as manipulations of an input device (such as a joystick, data glove, mouse, light pen, and/or keyboard). In some embodiments, the virtual camera position and/or orientation may be controlled based on measurements of a user's head position and/or orientation and/or eye orientation(s).

In step 435, the rendering pipeline RP(K) may perform a homogenous perspective transformation to map primitives from the camera coordinate system into a clipping space, which is more convenient for a subsequent clipping computation. In some embodiments, steps 430 and 435 may be combined into a single transformation.

In step 437, rendering pipeline RP(K) may assemble the vertices to form primitives such as triangles, lines, etc.

In step 440, rendering pipeline RP(K) may perform a clipping computation on each primitive. In clipping space, the vertices of primitives may be represented as 4-tuples (X,Y,Z,W). In some embodiments, the clipping computation may be implemented by performing a series of inequality tests as follows:

$$T1=(-W \leq X)$$

$$T2=(X \leq W)$$

$$T3=(-W \leq Y)$$

$$T4=(Y \leq W)$$

$$T5=(-W \leq Z)$$

$$T6=(Z \leq 0)$$

If all the test flags are true, a vertex resides inside the canonical view volume. If any of the test flags are false, the vertex is outside the canonical view volume. An edge between vertices A and B is inside the canonical view volume if both vertices are inside the canonical view volume. An edge can be trivially rejected if the expression Tk(A) OR Tk(B) is false for any k in the range from one to six. Otherwise, the edge requires testing to determine if it partially intersects the canonical view volume, and if so, to determine the points of intersection of the edge with the clipping planes. A primitive may thus be cut down to one or more interior sub-primitives (i.e. subprimitives that lie inside the canonical view volume). The rendering pipeline RP(K) may compute color intensity values for the new vertices generated by clipping.

Note that the example given above for performing the clipping computation is not meant to be limiting. Other methods may be used for performing the clipping computation.

In step 445, rendering pipeline RP(K) may perform a perspective divide computation on the homogenous post-clipping vertices (X,Y,Z,W) according to the relations $x=X/W$ $y=Y/W$ $z=Z/W.$ After the perspective divide, the x and y coordinates of each vertex (x,y,z) may reside in a viewport rectangle, for example, a viewport square defined by the inequalities $-1 \leq x \leq 1$ and $-1 \leq y \leq 1$.

In step 450, the rendering pipeline RP(K) may perform a render scale transformation on the post-clipping primitives. The render scale transformation may operate on the x and y coordinates of vertices, and may have the effect of mapping the viewport square in perspective-divided space onto (or into) the spatial bin array in virtual screen space, i.e., onto (or into) a rectangle whose width equals the array horizontal bin resolution $M_B$ and whose height equals the array vertical bin resolution $N_B$. Let $X_v$ and $Y_v$ denote the horizontal and vertical coordinate respectively in the virtual screen space.

Figure 5:
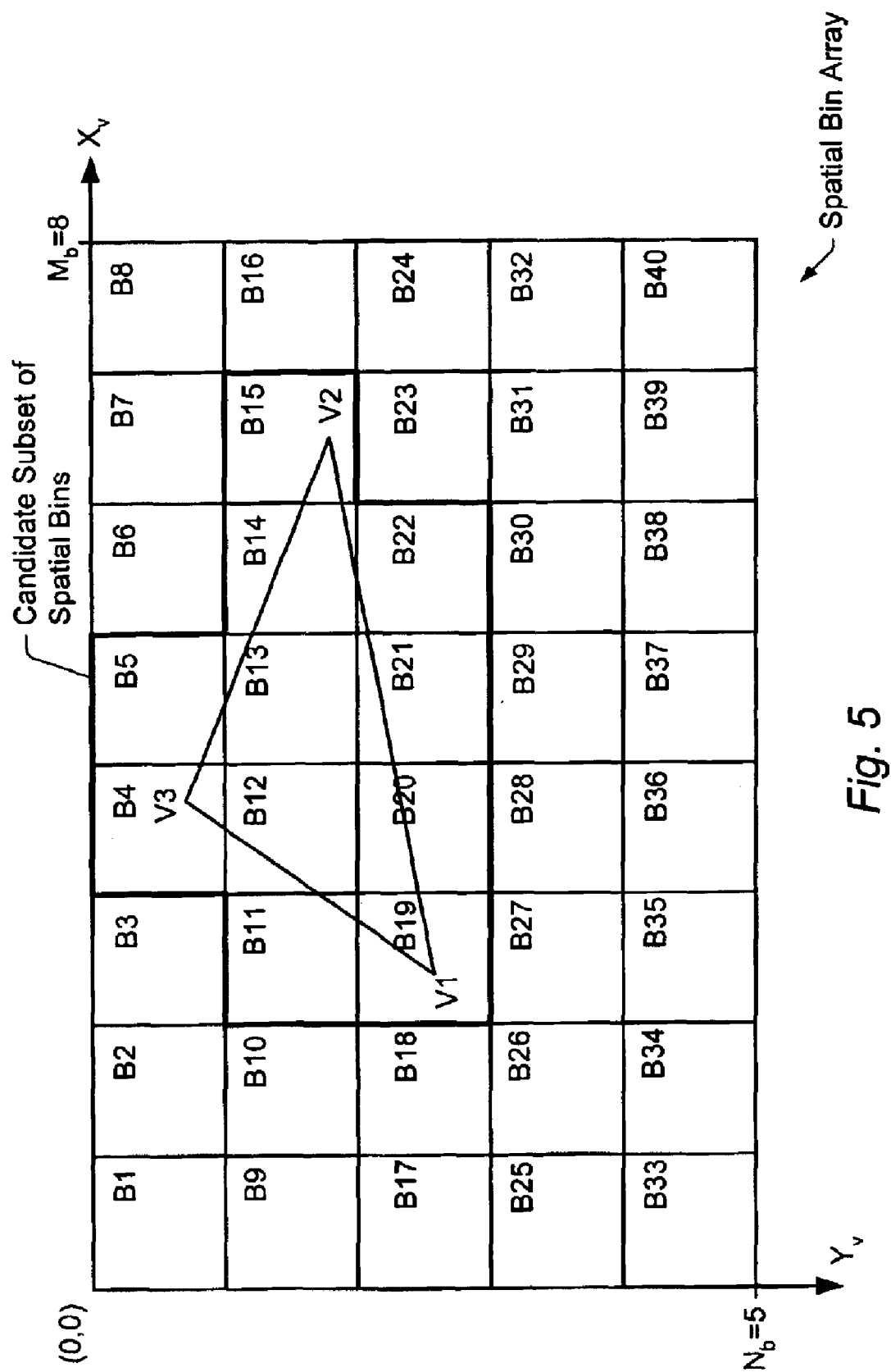
FIG. 5 illustrates a set of candidate bins which intersect a particular triangle.

In step 455, the rendering pipeline RP(K) may identify spatial bins which geometrically intersect with the post-scaling primitive as suggested by FIG. 5. Bins in this subset are referred to as "candidate" bins or "intersecting" bins. It is noted that values $M_B=8$ and $N_B=5$ for the dimensions of the spatial bin array have been chosen for sake of illustration, and are much smaller than would typically be used in most applications of graphics system 100.

Figure 6:
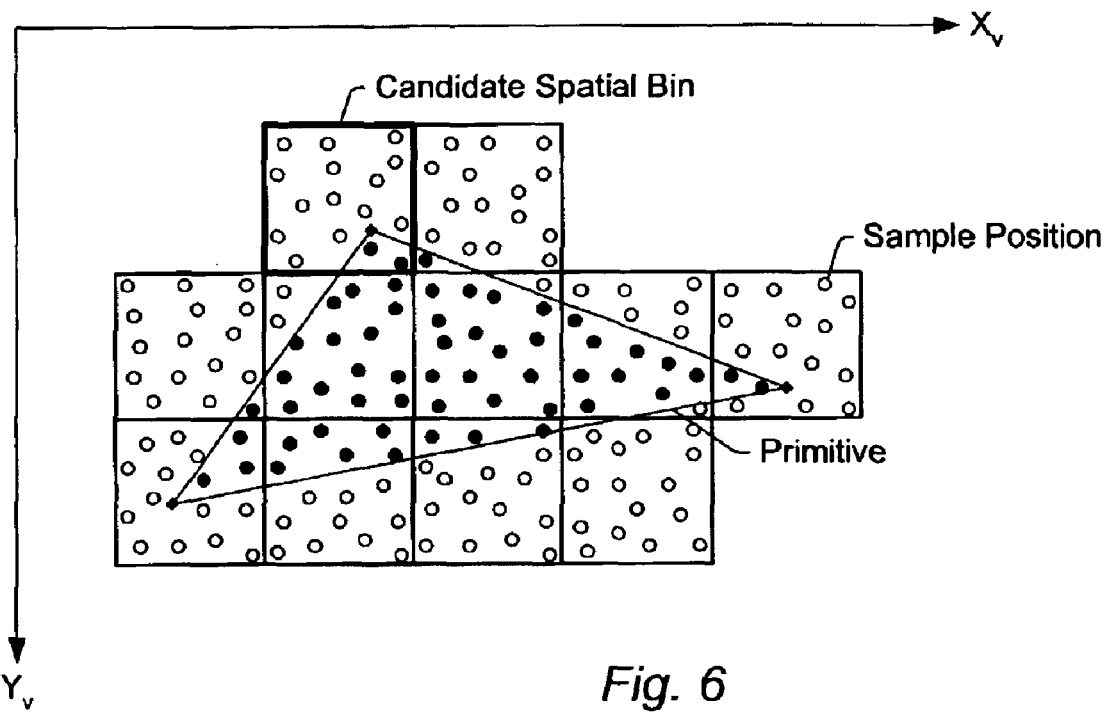
FIG. 6 illustrates the identification of sample positions in the candidate bins which fall interior to the triangle.

In step 460, the rendering pipeline RP(K) performs a "sample fill" operation on candidate bins identified in step 455 as suggested by FIG. 6. In the sample fill operation, the rendering pipeline RP(K) populates candidate bins with sample positions, identifies which of the sample positions reside interior to the primitive, and computes sample values (such as red, green, blue, z and alpha) at each of the interior sample positions. The rendering pipeline RP(K) may include a plurality of sample fill units to parallelize the sample fill computation. For example, two sample fill units may perform the sample fill operation in parallel on two candidate bins respectively. (This N=2 example generalizes to any number of parallel sample fill units). In FIG. 6, interior sample positions are denoted as small black dots, and exterior sample positions are denoted as small circles.

Figure 7:
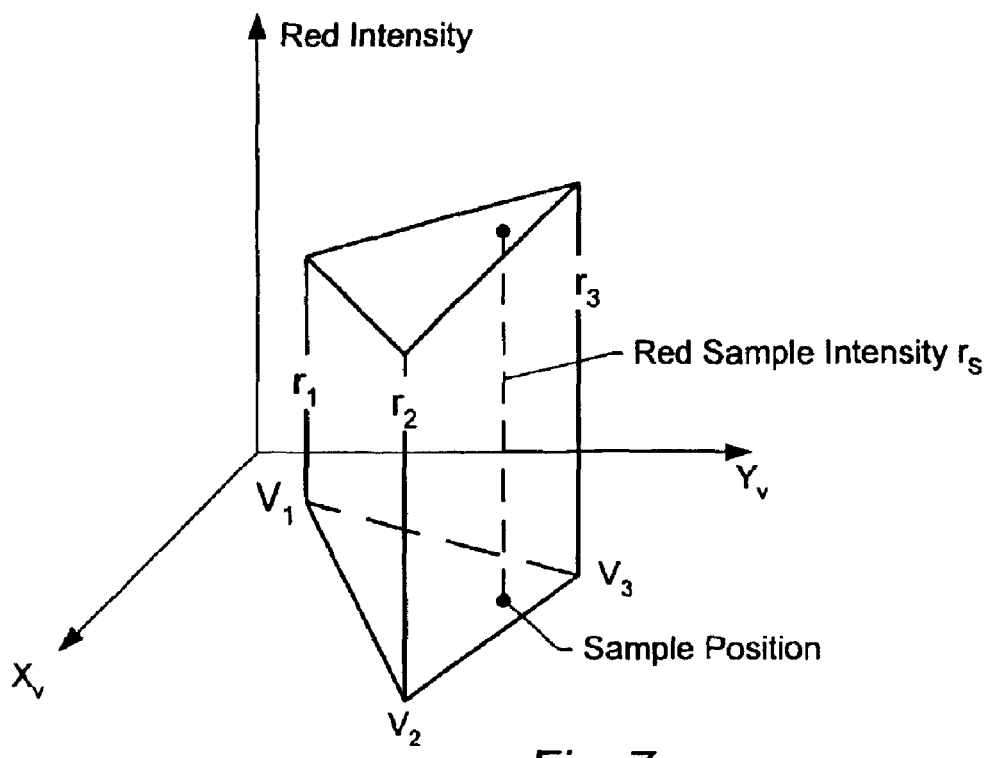
FIG. 7 illustrates the computation of a red sample component based on a spatial interpolation of the red components at the vertices of the containing triangle.

The rendering pipeline RP(K) may compute the color components (r,g,b) for each interior sample position in a candidate bin based on a spatial interpolation of the corresponding vertex color components as suggested by FIG. 7. FIG. 7 suggests a linear interpolation of a red intensity value $r_S$ for a sample position inside the triangle defined by the vertices V1, V2, and V3 in virtual screen space (i.e. the horizontal plane of the figure). The red color intensity is shown as the up-down coordinate. Each vertex Vk has a corresponding red intensity value $r_k$. Similar interpolations may be performed to determine green, blue, z and alpha values.

In step 465, rendering pipeline RP(K) may compute a vector of texture values for each candidate bin. The rendering pipeline RP(K) may couple to a corresponding texture memory TM(K). The texture memory TM(K) may be used to store one or more layers of texture information. Rendering pipeline RP(K) may use texture coordinates associated with a candidate bin to read texels from the texture memory TM(K). The texels may be filtered to generate the vector of texture values. The rendering pipeline RP(K) may include a plurality of texture filtering units to parallelize the computation of texture values for one or more candidate bins.

The rendering pipeline RP(K) may include a sample fill pipeline which implements step 460 and a texture pipeline which implements step 465. The sample fill pipeline and the texture pipeline may be configured for parallel operation. The sample fill pipeline may perform the sample fill operations on one or more candidate bins while the texture fill pipeline computes the texture values for the one or more candidate bins.

In step 470, the rendering pipeline RP(K) may apply the one or more texture values corresponding to each candidate bin to the color vectors of the interior samples in the candidate bin. Any of a variety of methods may be used to apply the texture values to the sample color vectors.

In step 475, the rendering pipeline RP(K) may forward the computed samples to the scheduling network 400 for storage in the sample buffer 500.

The sample buffer 500 may be configured to support double-buffered operation. The sample buffer may be logically partitioned into two buffer segments A and B. The rendering engine 300 may write into buffer segment A while the filtering engine 600 reads from buffer segment B. At the end of a frame of animation, a host application (running on a host computer) may assert a buffer swap command. In response to the buffer swap command, control of buffer segment A may be transferred to the filtering engine 600, and control of buffer segment B may be transferred to rendering engine 300. Thus, the rendering engine 300 may start writing samples into buffer segment B, and the filtering engine 600 may start reading samples from buffer segment A.

It is noted that usage of the term "double-buffered" does not necessarily imply that all components of samples are double-buffered in the sample buffer 500. For example, sample color may be double-buffered while other components such as z depth may be single-buffered.

In some embodiments, the sample buffer 500 may be triple-buffered or N-fold buffered, where N is greater than two.

Filtration of Samples to Determine Pixels

Filtering engine 600 may access samples from a buffer segment (A or B) of the sample buffer 500, and generate video pixels from the samples. Each buffer segment of sample buffer 500 may be configured to store an $M_B \times N_B$ array of bins. Each bin may store $N_{s/b}$ samples. The values $M_B$, $N_B$ and $N_{s/b}$ are programmable parameters.

Figure 8:
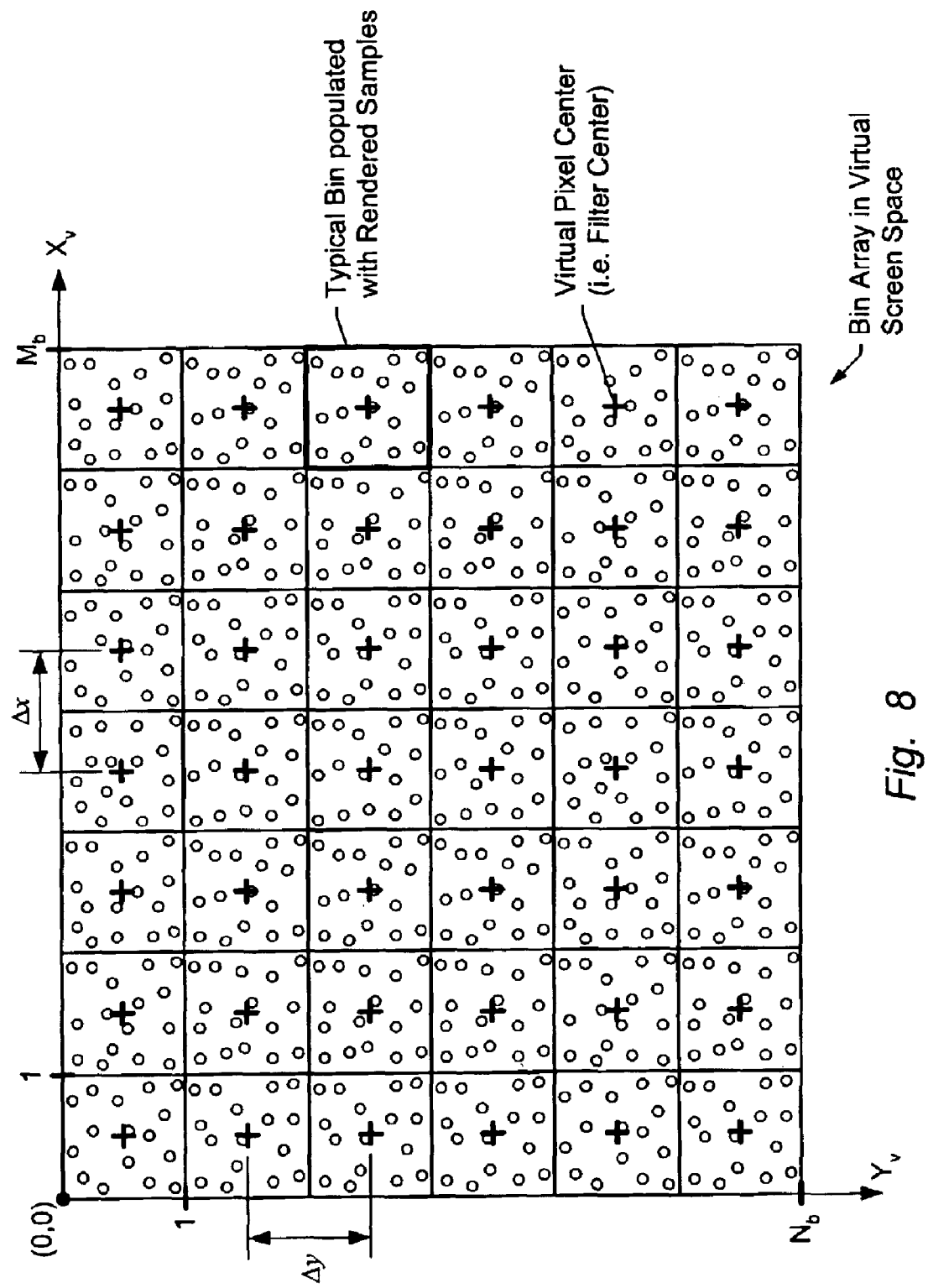
FIG. 8 illustrates an array of virtual pixel positions distributed in the virtual screen space and superimposed on top of the array of spatial bins.

As suggested by FIG. 8, filtering engine 600 may scan through virtual screen space in raster fashion generating virtual pixel positions denoted by the small plus markers, and generating a video pixel at each of the virtual pixel positions based on the samples (small circles) in the neighborhood of the virtual pixel position. The virtual pixel positions are also referred to herein as filter centers (or kernel centers) since the video pixels are computed by means of a filtering of samples. The virtual pixel positions form an array with horizontal displacement $\Delta X$ between successive virtual pixel positions in a row and vertical displacement $\Delta Y$ between successive rows. The first virtual pixel position in the first row is controlled by a start position ($X_{start}, Y_{start}$). The horizontal displacement $\Delta X$, vertical displacement $\Delta Y$ and the start coordinates $X_{start}$ and $Y_{start}$ are programmable parameters.

FIG. 8 illustrates a virtual pixel position at the center of each bin. However, this arrangement of the virtual pixel positions (at the centers of render pixels) is a special case. More generally, the horizontal displacement $\Delta x$ and vertical displacement $\Delta y$ may be assigned values greater than or less than one. Furthermore, the start position ($X_{start}, Y_{start}$) is not constrained to lie at the center of a spatial bin. Thus, the vertical resolution $N_P$ of the array of virtual pixel centers may be different from $N_B$, and the horizontal resolution $M_P$ of the array of virtual pixel centers may be different from $M_B$.

Figure 9:
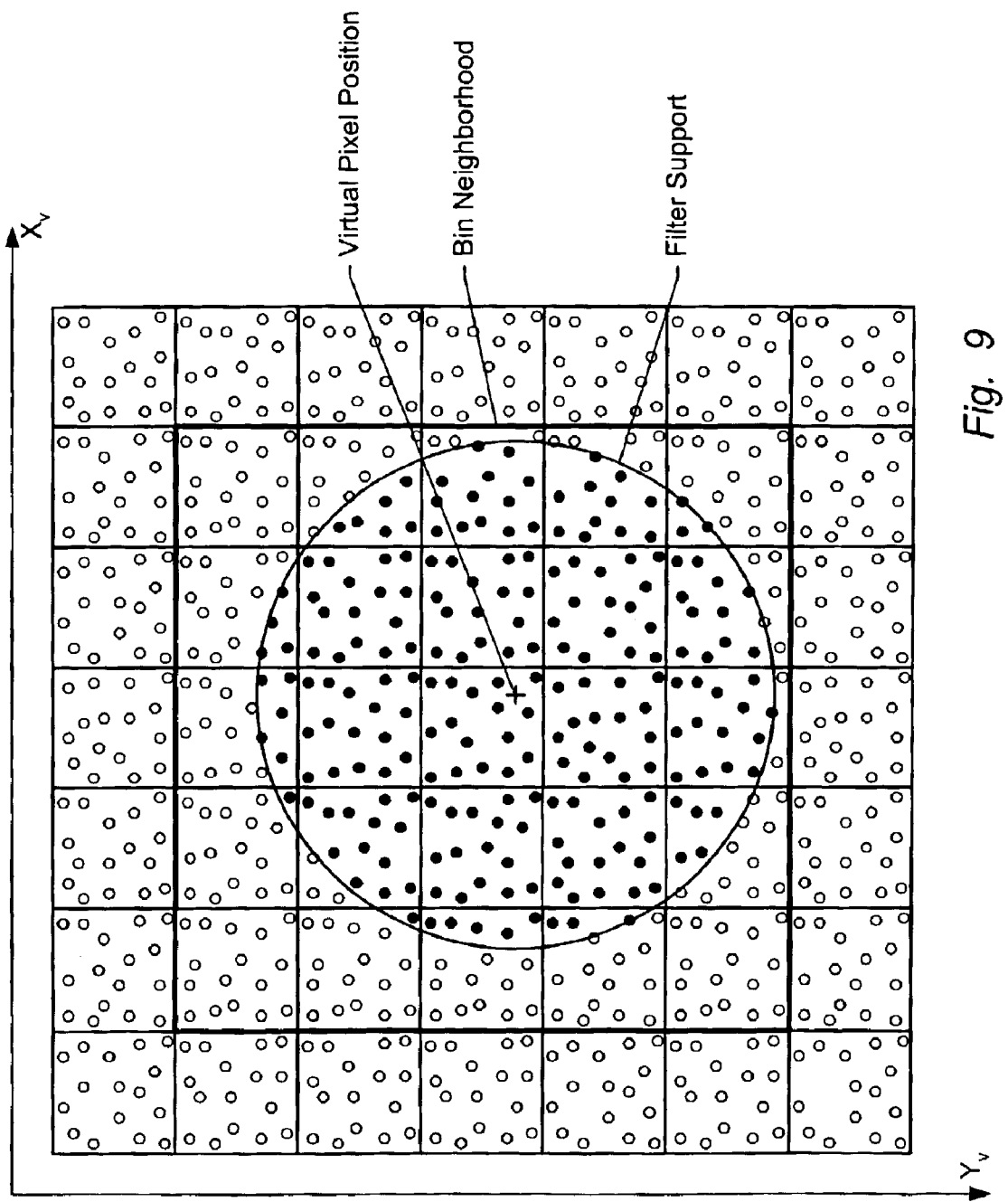
FIG. 9 illustrates the computation of a pixel at a virtual pixel position (denoted by the plus marker) according to one set of embodiments.

The filtering engine 600 may compute a video pixel at a particular virtual pixel position as suggested by FIG. 9. The filtering engine 600 may compute the video pixel based on a filtration of the samples falling within a support region centered on (or defined by) the virtual pixel position. Each sample S falling within the support region may be assigned a filter coefficient $C_S$ based on the sample's position (or some function of the sample's radial distance) with respect to the virtual pixel position.

Each of the color components of the video pixel may be determined by computing a weighted sum of the corresponding sample color components for the samples falling inside the filter support region. For example, the filtering engine 600 may compute an initial red value $r_P$ for the video pixel P according to the expression $$r_P = \Sigma C_S r_S,$$

where the summation ranges over each sample S in the filter support region, and where $r_S$ is the red sample value of the sample S. In other words, the filtering engine 600 may multiply the red component of each sample S in the filter support region by the corresponding filter coefficient $C_S$, and add up the products. Similar weighted summations may be performed to determine an initial green value $g_P$, an initial blue value $b_P$, and optionally, an initial alpha value $\alpha_P$ for the video pixel P based on the corresponding components of the samples.

Furthermore, the filtering engine 600 may compute a normalization value E by adding up the filter coefficients $C_S$ for the samples S in the bin neighborhood, i.e., $$E = \Sigma C_S.$$

The initial pixel values may then be multiplied by the reciprocal of E (or equivalently, divided by E) to determine normalized pixel values:

$$R_P = (1/E)^* r_P$$

$$G_P = (1/E)^* g_P$$

$$B_P = (1/E)^* b_P$$

$$A_P = (1/E)^* \alpha_P.$$

In one set of embodiments, the filter coefficient $C_S$ for each sample S in the filter support region may be determined by a table lookup. For example, a radially symmetric filter may be realized by a filter coefficient table, which is addressed by a function of a sample's radial distance with respect to the virtual pixel center. The filter support for a radially symmetric filter may be a circular disk as suggested by the example of FIG. 9. The support of a filter is the region in virtual screen space on which the filter is defined. The terms "filter" and "kernel" are used as synonyms herein. Let $R_f$ denote the radius of the circular support disk.

The filtering engine 600 may examine each sample S in a neighborhood of bins containing the filter support region. The bin neighborhood may be a rectangle (or square) of bins. For example, in one embodiment the bin neighborhood is a 5×5 array of bins centered on the bin which contains the virtual pixel position.

The filtering engine 600 may compute the square radius $(D_S)^2$ of each sample position $(X_S, Y_S)$ in the bin neighborhood with respect to the virtual pixel position $(X_P, Y_P)$ according to the expression $$(D_S)^2 = (X_S - X_P)^2 + (Y_S - Y_P)^2.$$

The square radius $(D_S)^2$ may be compared to the square radius $(R_f)^2$ of the filter support. If the sample's square radius is less than (or, in a different embodiment, less than or equal to) the filter's square radius, the sample S may be marked as being valid (i.e., inside the filter support). Otherwise, the sample S may be marked as invalid.

The filtering engine 600 may compute a normalized square radius $U_S$ for each valid sample S by multiplying the sample's square radius by the reciprocal of the filter's square radius:

$$U_S = (D_S)^2 \frac{1}{(R_f)^2}.$$

The normalized square radius $U_S$ may be used to access the filter coefficient table for the filter coefficient $C_S$. The filter coefficient table may store filter weights indexed by the normalized square radius.

In various embodiments, the filter coefficient table is implemented in RAM and is programmable by host software. Thus, the filter function (i.e. the filter kernel) used in the filtering process may be changed as needed or desired. Similarly, the square radius $(R_f)^2$ of the filter support and the reciprocal square radius $1/(R_f)^2$ of the filter support may be programmable.

Because the entries in the filter coefficient table are indexed according to normalized square distance, they need not be updated when the radius $R_f$ of the filter support changes. The filter coefficients and the filter radius may be modified independently.

In one embodiment, the filter coefficient table may be addressed with the sample radius $D_S$ at the expense of computing a square root of the square radius $(D_S)^2$. In another embodiment, the square radius may be converted into a floating-point format, and the floating-point square radius may be used to address the filter coefficient table. It is noted that the filter coefficient table may be indexed by any of various radial distance measures. For example, an $L^1$ norm or $L^{infinity}$ norm may be used to measure the distance between a sample position and the virtual pixel center.

Invalid samples may be assigned the value zero for their filter coefficients. Thus, the invalid samples end up making a null contribution to the pixel value summations. In other embodiments, filtering hardware internal to the filtering engine may be configured to ignore invalid samples. Thus, in these embodiments, it is not necessary to assign filter coefficients to the invalid samples.

In some embodiments, the filtering engine 600 may support multiple filtering modes. For example, in one collection of embodiments, the filtering engine 600 supports a box filtering mode as well as a radially symmetric filtering mode. In the box filtering mode, filtering engine 600 may implement a box filter over a rectangular support region, e.g., a square support region with radius $R_f$ (i.e. side length $2R_f$). Thus, the filtering engine 600 may compute boundary coordinates for the support square according to the expressions $X_P+R_f$, $X_P-R_f$, $Y_P+R_f$, and $Y_P-R_f$. Each sample S in the bin neighborhood may be marked as being valid if the sample's position $(X_S, Y_S)$ falls within the support square, i.e., if $X_P-R_f<X_S<X_P+R_f$ and $Y_P-R_f<Y_S<Y_P+R_f$.

Otherwise the sample S may be marked as invalid. Each valid sample may be assigned the same filter weight value (e.g., $C_S=1$). It is noted that any or all of the strict inequalities (<) in the system above may be replaced with permissive inequalities ($\leq$). Various embodiments along these lines are contemplated.

The filtering engine 600 may use any of a variety of filters either alone or in combination to compute pixel values from sample values. For example, the filtering engine 600 may use a box filter, a tent filter, a cone filter, a cylinder filter, a Gaussian filter, a Catmull-Rom filter, a Mitchell-Netravali filter, a windowed sinc filter, or in general, any form of band pass filter or any of various approximations to the sinc filter.

In one set of embodiments, the filtering engine 600 may include a set of filtering units FU(0), FU(1), FU(2), . . . , FU($N_f$-1) operating in parallel, where the number $N_f$ of filtering units is a positive integer. For example, in one embodiment, $N_f=4$. In another embodiment, $N_f=8$.

The filtering units may be configured to partition the effort of generating each frame (or field of video). A frame of video may comprise an $M_P \times N_P$ array of pixels, where $M_P$ denotes the number of pixels per line, and $N_P$ denotes the number of lines. Each filtering unit FU(K) may be configured to generate a corresponding subset of the pixels in the $M_P \times N_P$ pixel array. For example, in the $N_f=4$ case, the pixel array may be partitioned into four vertical stripes, and each filtering unit FU(K), K=0, 1, 2, 3, may be configured to generate the pixels of the corresponding stripe.

Filtering unit FU(K) may include a system of digital circuits, which implement the processing loop suggested below. The values $X_{start}(K)$ and $Y_{start}(K)$ represent the start position for the first (e.g. top-left) virtual pixel center in the $K^{th}$ stripe of virtual pixel centers. The values $\Delta X(K)$ and $\Delta Y(K)$ represent respectively the horizontal and vertical step size between virtual pixel centers in the $K^{th}$ stripe. The value $M_H(K)$ represents the number of pixels horizontally in the $K^{th}$ stripe. For example, if there are four stripes ($N_f=4$) with equal width, $M_H(K)$ may be set equal to $M_P/4$ for K=0, 1, 2, 3. Filtering unit FU(K) may generate a stripe of pixels in a scan line fashion as follows:

```
I=0;
J=0;
X_P=X_start(K);
Y_P=Y_start(K);
while (J<N_P) {
    while (I < M_H(K) {
        PixelValues = Filtration(X_P,Y_P);
        Send PixelValues to Output Buffer;
        X_P = X_P+ΔX(K);
        I = I + 1;
    }
    X_P=X_start(K)
    Y_P=Y_P+ΔY(K);
```

-continued

```
    J=J+1;
}
```

The expression Filtration($X_P, Y_P$) represents the filtration of samples in the filter support region of the current virtual pixel position ($X_P, Y_P$) to determine the components (e.g. RGB values, and optionally, an alpha value) of the current pixel as described above. Once computed, the pixel values may be sent to an output buffer for merging into a video stream. The inner loop generates successive virtual pixel positions within a single row of the stripe. The outer loop generates successive rows. The above fragment may be executed once per video frame (or field). Filtering unit FU(K) may include registers for programming the values $X_{start}(K)$, $Y_{start}(K)$, $\Delta X(K)$, $\Delta Y(K)$, and $M_H(K)$. These values are dynamically adjustable from host software. Thus, the graphics system 100 may be configured to support arbitrary video formats.

Figure 10:
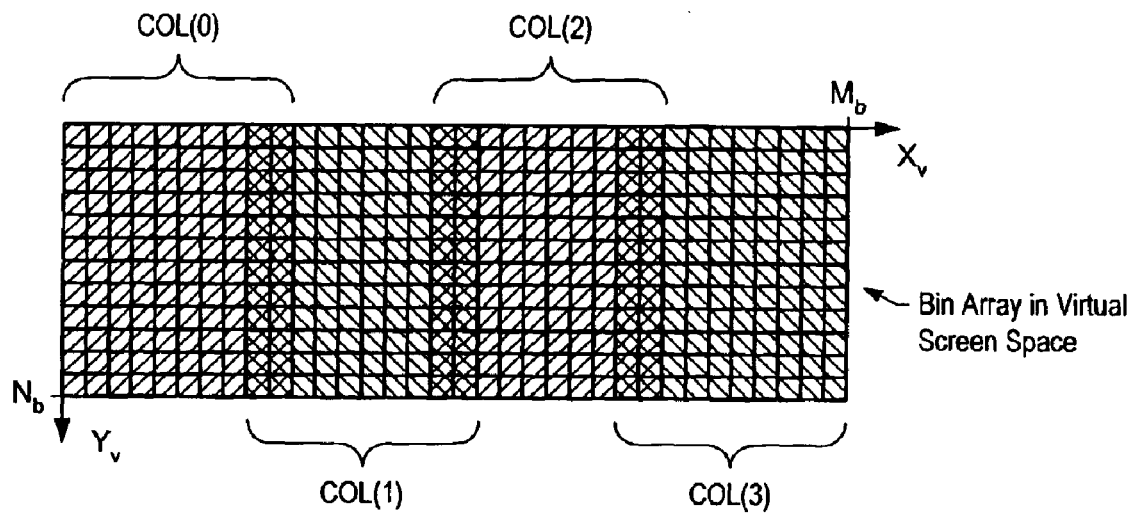
FIG. 10 illustrates a set of columns in the spatial bin array, wherein the $K^{th}$ column defines the subset of memory bins (from the sample buffer) which are used by a corresponding filtering unit FU(K) of the filtering engine.

Each filtering unit FU(K) accesses a corresponding subset of bins from the sample buffer 500 to generate the pixels of the $K^{th}$ stripe. For example, each filtering unit FU(K) may access bins corresponding to a column COL(K) of the bin array in virtual screen space as suggested by FIG. 10. Each column may be a rectangular subarray of bins. Note that column COL(K) may overlap with adjacent columns. This is a result of using a filter function with filter support that covers more than one spatial bin. Thus, the amount of overlap between adjacent columns may depend on the radius of the filter support.

Figure 11:
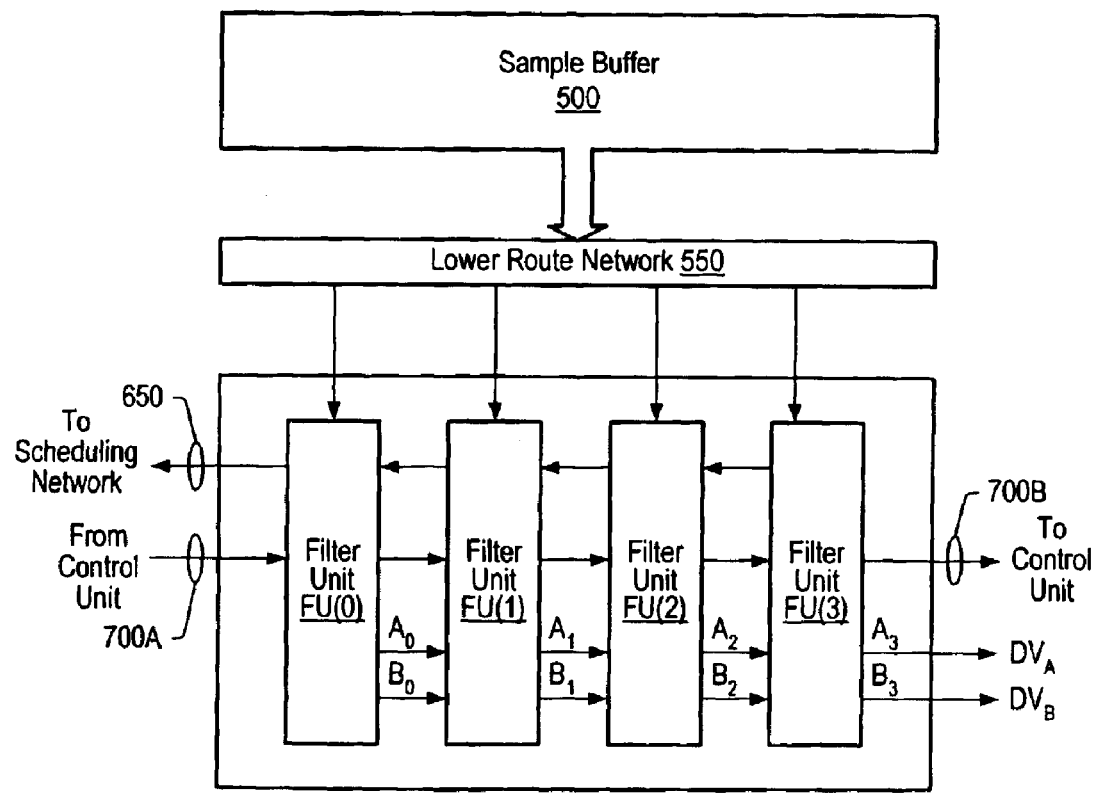
FIG. 11 illustrates one set of embodiments of filtering engine 600.

The filtering units may be coupled together in a linear succession as suggested by FIG. 11 in the case $N_f=4$. Except for the first filtering unit FU(0) and the last filtering unit FU($N_f$-1), each filtering unit FU(K) may be configured to receive digital video input streams $A_{K-1}$ and $B_{K-1}$ from a previous filtering unit FU(K-1), and to transmit digital video output streams $A_K$ and $B_K$ to the next filtering unit FU(K+1). The first filtering unit FU(0) generates video streams $A_0$ and $B_0$ and transmits these streams to filtering unit FU(1). The last filtering unit FU($N_f$-1) receives digital video streams $A_{Nf-2}$ and $B_{Nf-2}$ from the previous filtering unit FU($N_f$-2), and generates digital video output streams $A_{Nf-1}$ and $B_{Nf-1}$ also referred to as video streams $DV_A$ and $DV_B$ respectively. Video streams $A_0, A_1, \ldots, A_{Nf-1}$ are said to belong to video stream A. Similarly, video streams $B_0, B_1, \ldots, B_{Nf-1}$ are said to belong to video stream B.

Each filtering unit FU(K) may be programmed to mix (or substitute) its computed pixel values into either video stream A or video stream B. For example, if the filtering unit FU(K) is assigned to video stream A, the filtering unit FU(K) may mix (or substitute) its computed pixel values into video stream A, and pass video stream B unmodified to the next filtering unit FU(K+1). In other words, the filtering unit FU(K) may mix (or replace) at least a subset of the dummy pixel values present in video stream $A_{K-1}$ with its locally computed pixel values. The resultant video stream $A_K$ is transmitted to the next filtering unit. The first filtering unit FU(0) may generate video streams $A_{-1}$ and $B_{-1}$ containing dummy pixels (e.g., pixels having a background color), and mix (or substitute) its computed pixel values into either video stream $A_{-1}$ or $B_{-1}$, and pass the resulting streams $A_0$ and $B_0$ to the filtering unit FU(1). Thus, the video streams A and B mature into complete video signals as they are operated on by the linear succession of filtering units.

The filtering unit FU(K) may also be configured with one or more of the following features: color look-up using pseudo color tables, direct color, inverse gamma correction, and conversion of pixels to non-linear light space. Other features may include programmable video timing generators, programmable pixel clock synthesizers, cursor generators, and crossbar functions.

While much of the present discussion has focused on the case where $N_f=4$, it is noted that the inventive principles described in this special case naturally generalize to arbitrary values for the parameter $N_f$ (the number of filtering units).

Figure 12:
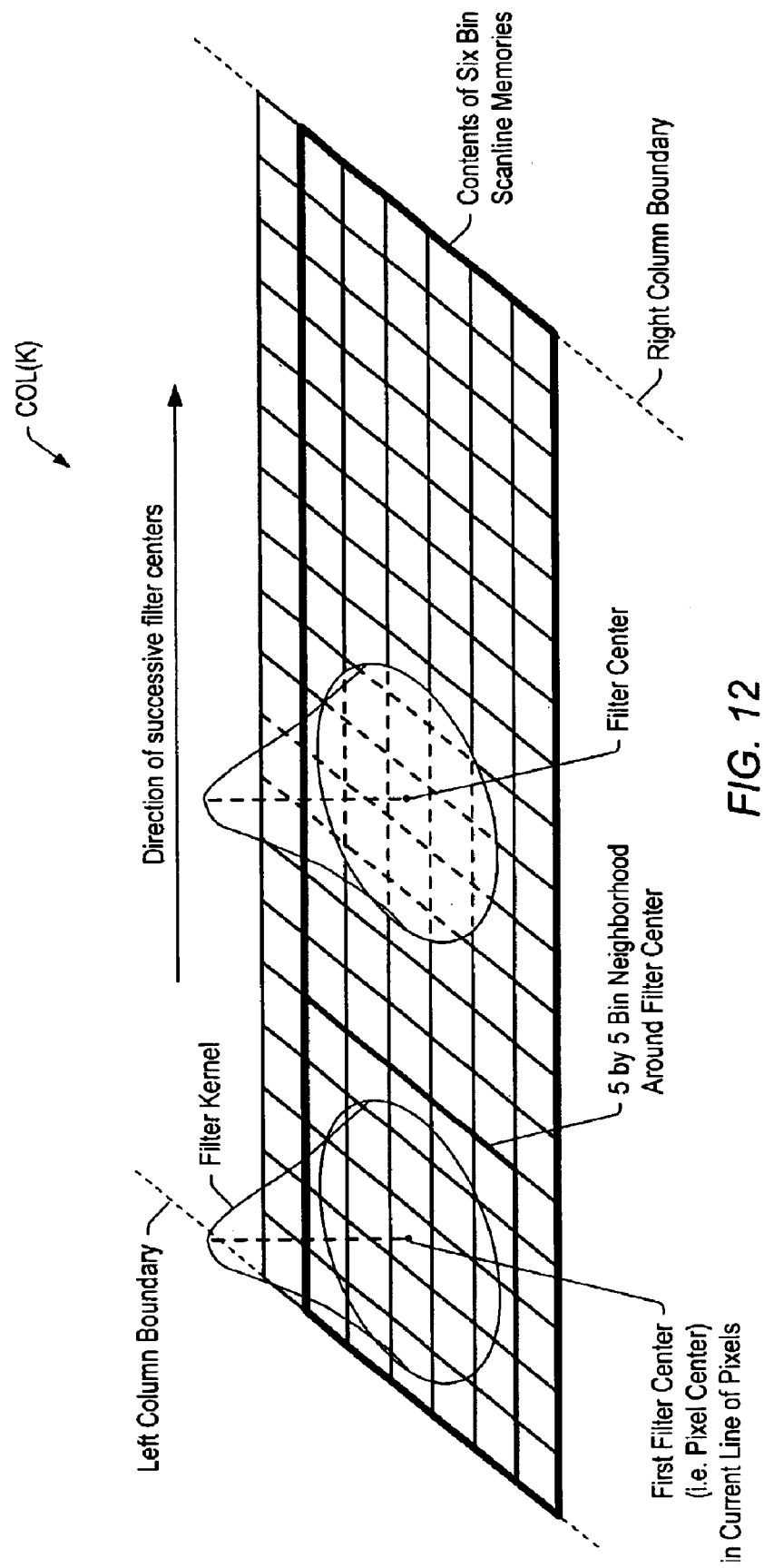
FIG. 12 illustrates one embodiment of a computation of pixels at successive filter center (i.e. virtual pixel centers) across a bin column.

In one set of embodiments, each filtering unit FU(K) may include (or couple to) a plurality of bin scanline memories (BSMs). Each bin scanline memory may contain sufficient capacity to store a horizontal line of bins within the corresponding column COL(K). For example, in some embodiments, filtering unit FU(K) may include six bin scanline memories as suggested by FIG. 12.

Filtering unit FU(K) may move the filter centers through the column COL(K) in a raster fashion, and generate a pixel at each filter center. The bin scanline memories may be used to provide fast access to the memory bins used for a line of pixel centers. As the filtering unit FU(K) may use samples in a 5 by 5 neighborhood of bins around a pixel center to compute a pixel, successive pixels in a line of pixels end up using a horizontal band of bins that spans the column and measures five bins vertically. Five of the bin scan lines memories may store the bins of the current horizontal band. The sixth bin scan line memory may store the next line of bins, after the current band of five, so that the filtering unit FU(K) may immediately begin computation of pixels at the next line of pixel centers when it reaches the end of the current line of pixel centers.

As the vertical displacement $\Delta Y$ between successive lines of virtual pixels centers may be less than the vertical size of a bin, not every vertical step to a new line of pixel centers necessarily implies use of a new line of bins. Thus, a vertical step to a new line of pixel centers will be referred to as a nontrivial drop down when it implies the need for a new line of bins. Each time the filtering unit FU(K) makes a nontrivial drop down to a new line of pixel centers, one of the bin scan line memories may be loaded with a line of bins in anticipation of the next nontrivial drop down.

Much of the above discussion has focused on the use of six bin scanline memories in each filtering unit. However, more generally, the number of bin scanline memories may be one larger than the diameter (or side length) of the bin neighborhood used for the computation of a single pixel. (For example, in an alternative embodiment, the bin neighborhood may be a 7×7 array of bins.)

Furthermore, each of the filtering units FU(K) may include a bin cache array to store the memory bins that are immediately involved in a pixel computation. For example, in some embodiments, each filtering unit FU(K) may include a 5×5 bin cache array, which stores the 5×5 neighborhood of bins that are used in the computation of a single pixel. The bin cache array may be loaded from the bin scanline memories.

As noted above, each rendering pipeline of the rendering engine 300 generates sample positions in the process of rendering primitives. Sample positions within a given spatial bin may be generated by adding a vector displacement $(\Delta X, \Delta Y)$ to the vector position $(X_{bin}, Y_{bin})$ of the bin's origin (e.g. the top-left corner of the bin). To generate a set of sample positions within a spatial bin implies adding a corresponding set of vector displacements to the bin origin. To facilitate the generation of sample positions, each rendering pipeline may include a programmable jitter table which stores a collection of vector displacements $(\Delta X, \Delta Y)$. The jitter table may have sufficient capacity to store vector displacements for an $M_J \times N_J$ tile of bins. Assuming a maximum sample position density of $D_{max}$ samples per bin, the jitter table may then store $M_J * N_J * D_{max}$ vector displacements to support the tile of bins. Host software may load the jitter table with a pseudo-random pattern of vector displacements to induce a pseudo-random pattern of sample positions. In one embodiment, $M_J = N_J = 2$ and $D_{max} = 16$.

A straightforward application of the jitter table may result in a sample position pattern, which repeats with a horizontal period equal to $M_J$ bins, and a vertical period equal to $N_J$ bins. However, in order to generate more apparent randomness in the pattern of sample positions, each rendering engine may also include a permutation circuit, which applies transformations to the address bits going into the jitter table and/or transformations to the vector displacements coming out of the jitter table. The transformations depend on the bin horizontal address $X_{bin}$ and the bin vertical address $Y_{bin}$.

Each rendering unit may employ such a jitter table and permutation circuit to generate sample positions. The sample positions are used to compute samples, and the samples are written into sample buffer 500. Each filtering unit of the filtering engine 600 reads samples from sample buffer 500, and may filter the samples to generate pixels. Each filtering unit may include a copy of the jitter table and permutation circuit, and thus, may reconstruct the sample positions for the samples it receives from the sample buffer 500, i.e., the same sample positions that are used to compute the samples in the rendering pipelines. Thus, the sample positions need not be stored in sample buffer 500.

As noted above, sample buffer 500 stores the samples, which are generated by the rendering pipelines and used by the filtering engine 600 to generate pixels. The sample buffer 500 may include an array of memory devices, e.g., memory devices such as SRAMs, SDRAMs, RDRAMs, 3DRAMs or 3DRAM64s. In one collection of embodiments, the memory devices are 3DRAM64 devices manufactured by Mitsubishi Electric Corporation.

RAM is an acronym for random access memory.

SRAM is an acronym for static random access memory.

DRAM is an acronym for dynamic random access memory.

SDRAM is an acronym for synchronous dynamic random access memory.

RDRAM is an acronym for Rambus DRAM.

The memory devices of the sample buffer may be organized into $N_{MB}$ memory banks denoted MB(0), MB(1), MB(2), . . . , MB($N_{MB-1}$), where $N_{MB}$ is a positive integer. For example, in one embodiment, $N_{MB}$ equals eight. In another embodiment, $N_{MB}$ equals sixteen.

Each memory bank MB may include a number of memory devices. For example, in some embodiments, each memory bank includes four memory devices.

Each memory device stores an array of data items. Each data item may have sufficient capacity to store sample color in a double-buffered fashion, and other sample components such as z depth in a single-buffered fashion. For example, in one set of embodiments, each data item may include 116 bits of sample data defined as follows:

30 bits of sample color (for front buffer), 30 bits of sample color (for back buffer), 16 bits of alpha and/or overlay, 10 bits of window ID, 26 bits of z depth, and
4 bits of stencil.

Each of the memory devices may include one or more pixel processors, referred to herein as memory-integrated pixel processors. The 3DRAM and 3DRAM64 memory devices manufactured by Mitsubishi Electric Corporation have such memory-integrated pixel processors. The memory-integrated pixel processors may be configured to apply processing operations such as blending, stenciling, and Z buffering to samples. 3DRAM64s are specialized memory devices configured to support internal double-buffering with single buffered Z in one chip.

Figure 13:
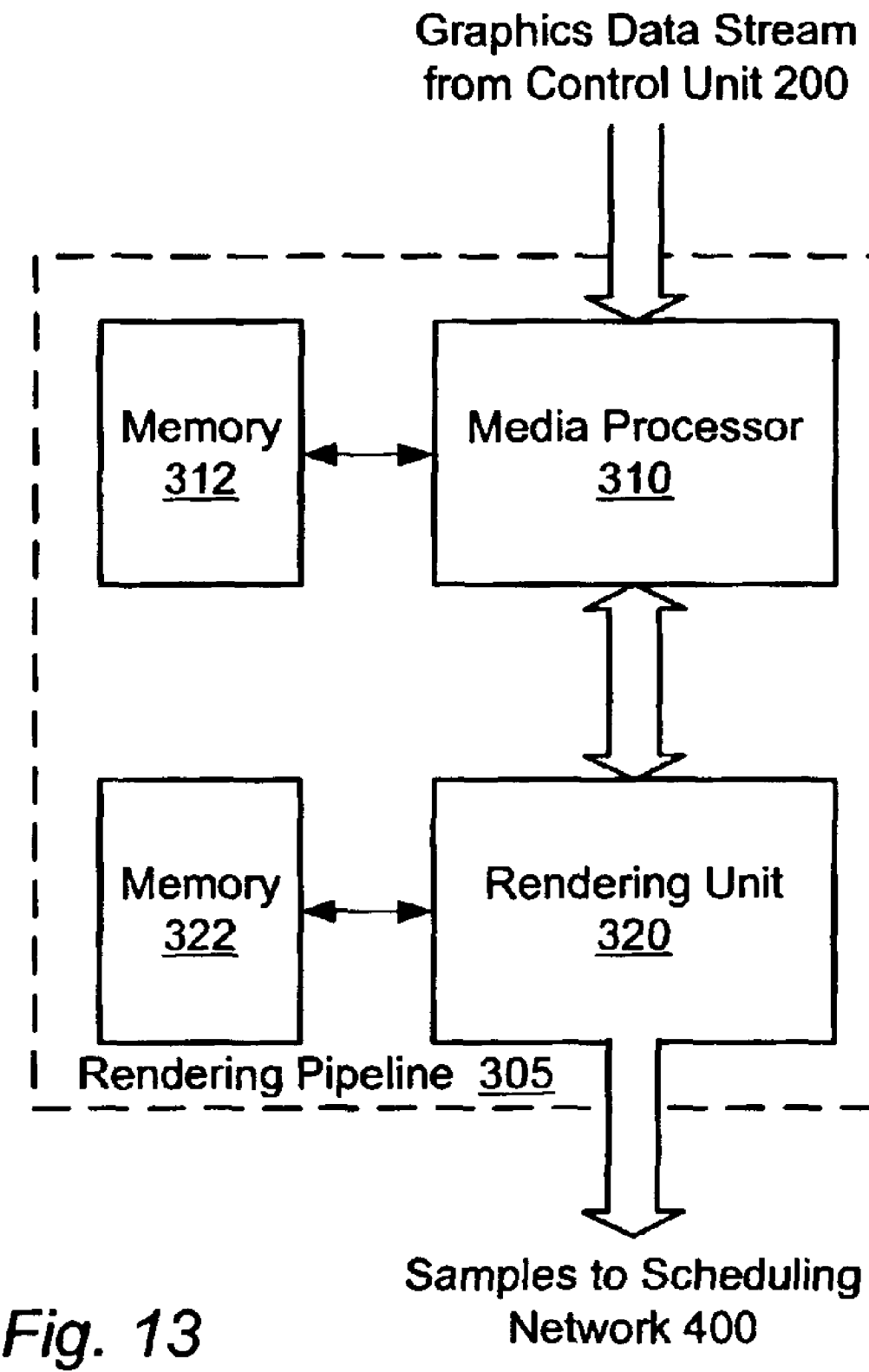
FIG. 13 illustrates one set of embodiments of a rendering pipeline comprising a media processor and a rendering unit.

As described above, the rendering engine 300 may include a set of rendering pipelines RP(0), RP(1), . . . , RP($N_{PL}$−1). FIG. 13 illustrates one embodiment of a rendering pipeline 305 that may be used to implement each of the rendering pipelines RP(0), RP(1), . . . , RP($N_{PL}$−1). The rendering pipeline 305 may include a media processor 310 and a rendering unit 320.

The media processor 310 may operate on a stream of graphics data received from the control unit 200. For example, the media processor 310 may perform the three-dimensional transformation operations and lighting operations such as those indicated by steps 410 through 435 of FIG. 4. The media processor 310 may be configured to support the decompression of compressed geometry data.

The media processor 310 may couple to a memory 312, and may include one or more microprocessor units. The memory 312 may be used to store program instructions and/or data for the microprocessor units. (Memory 312 may also be used to store display lists and/or vertex texture maps.) In one embodiment, memory 312 comprises direct Rambus DRAM (i.e. DRDRAM) devices.

The rendering unit 320 may receive transformed and lit vertices from the media processor, and perform processing operations such as those indicated by steps 437 through 475 of FIG. 4. In one set of embodiments, the rendering unit 320 is an application specific integrated circuit (ASIC). The rendering unit 320 may couple to memory 322 which may be used to store texture information (e.g., one or more layers of textures). Memory 322 may comprise SDRAM (synchronous dynamic random access memory) devices. The rendering unit 310 may send computed samples to sample buffer 500 through scheduling network 400.

Figure 14:
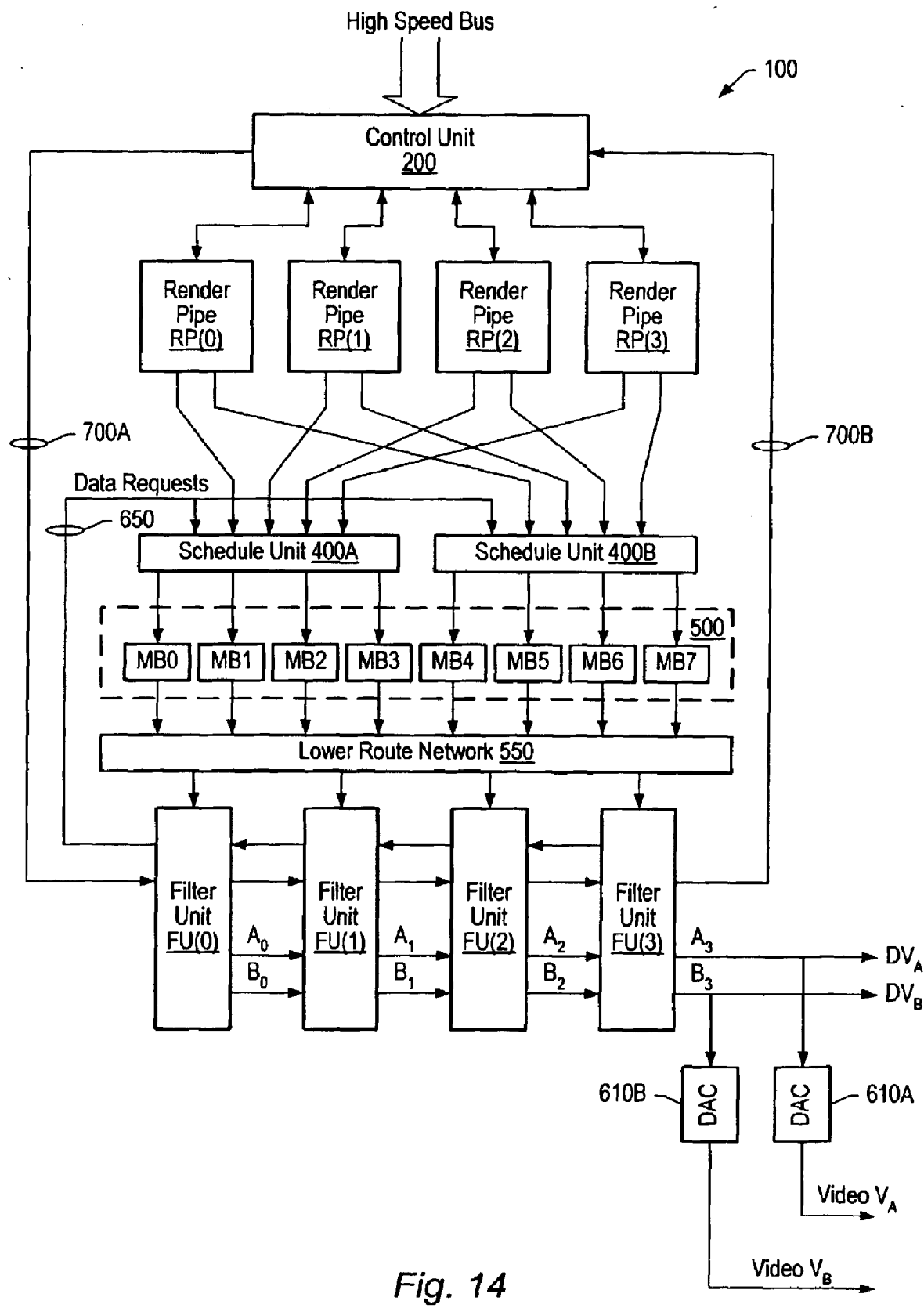
FIG. 14 illustrates one embodiment of graphics accelerator 100.

FIG. 14 illustrates one embodiment of the graphics accelerator 100. In this embodiment, the rendering engine 300 includes four rendering pipelines RP(0) through RP(3), scheduling network 400 includes two schedule units 400A and 400B, sample buffer 500 includes eight memory banks MB(0) through MB(7), and filtering engine 600 includes four filtering units FU(0) through FU(3). The filtering units may generate two digital video streams $DV_A$ and $DV_B$. The digital video streams $DV_A$ and $DV_B$ may be supplied to digital-to-analog converters (DACS) 610A and 610B, where they are converted into analog video signals $V_A$ and $V_B$ respectively. The analog video signals are supplied to video output ports. In addition, the graphics system 100 may include one or more video encoders. For example, the graphics system 100 may include an S-video encoder.

Figure 15:
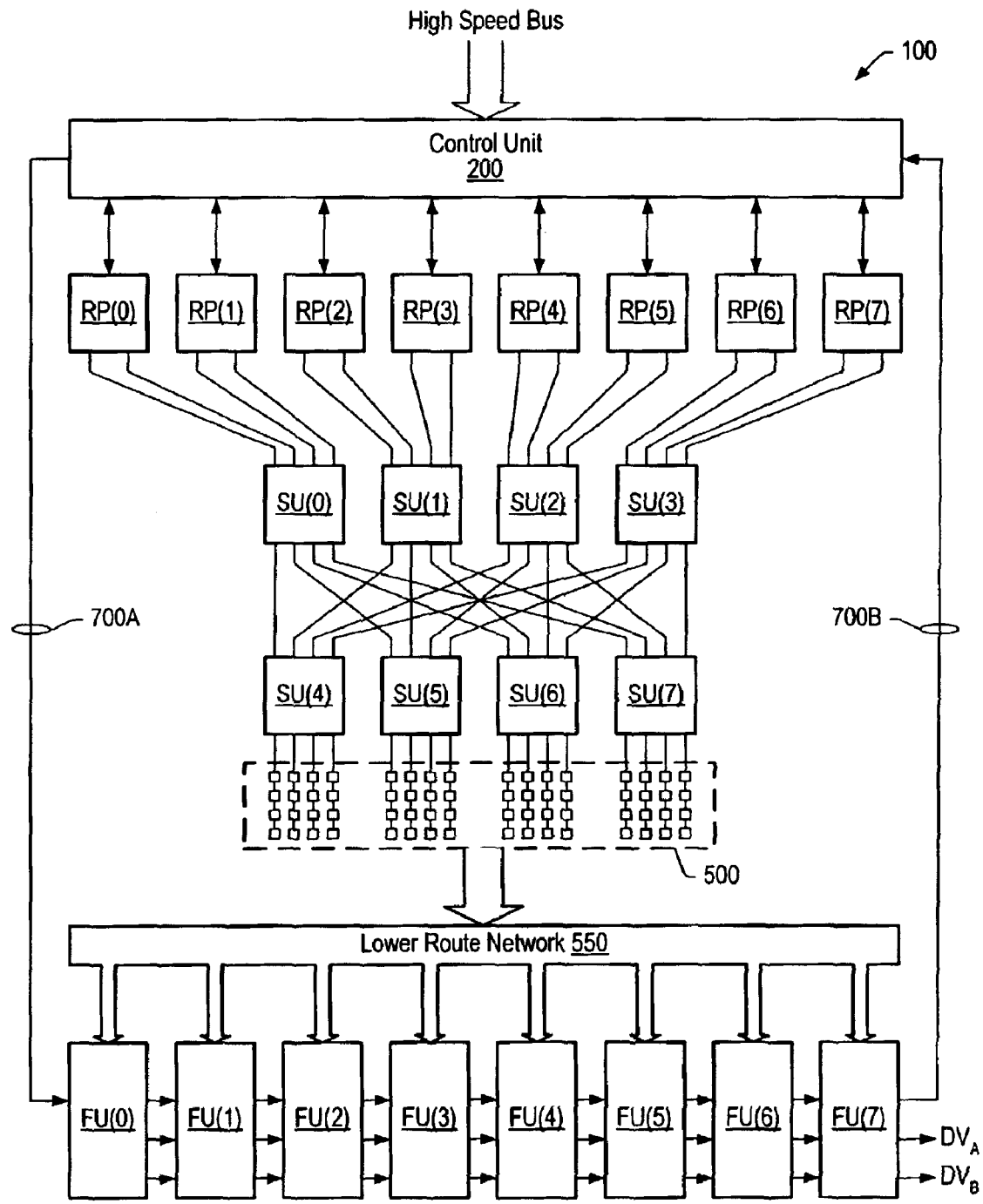
FIG. 15 illustrates another embodiment of graphics accelerator 100.

FIG. 15 illustrates another embodiment of graphics system 100. In this embodiment, the rendering engine 300 includes eight rendering pipelines RP(0) through RP(7), the scheduling network 400 includes eight schedule units SU(0) through SU(7), the sample buffer 500 includes sixteen memory banks, the filtering engine 600 includes eight filtering units FU(0) through FU(7). This embodiment of graphics system 100 also includes DACs to convert the digital video streams $DV_A$ and $DV_B$ into analog video signals.

Observe that the schedule units are organized as two layers. The rendering pipelines couple to the first layer of schedule unit SU(0) through SU(3). The first layer of schedule units couple to the second layer of schedule units SU(4) through SU(7). Each of the schedule units in the second layer couples to four banks of memory device in sample buffer 500.

The embodiments illustrated in FIGS. 14 and 15 are meant to suggest a vast ensemble of embodiments that are obtainable by varying design parameters such as the number of rendering pipelines, the number of schedule units, the number of memory banks, the number of filtering units, the number of video channels generated by the filtering units, etc.

Figure 16:
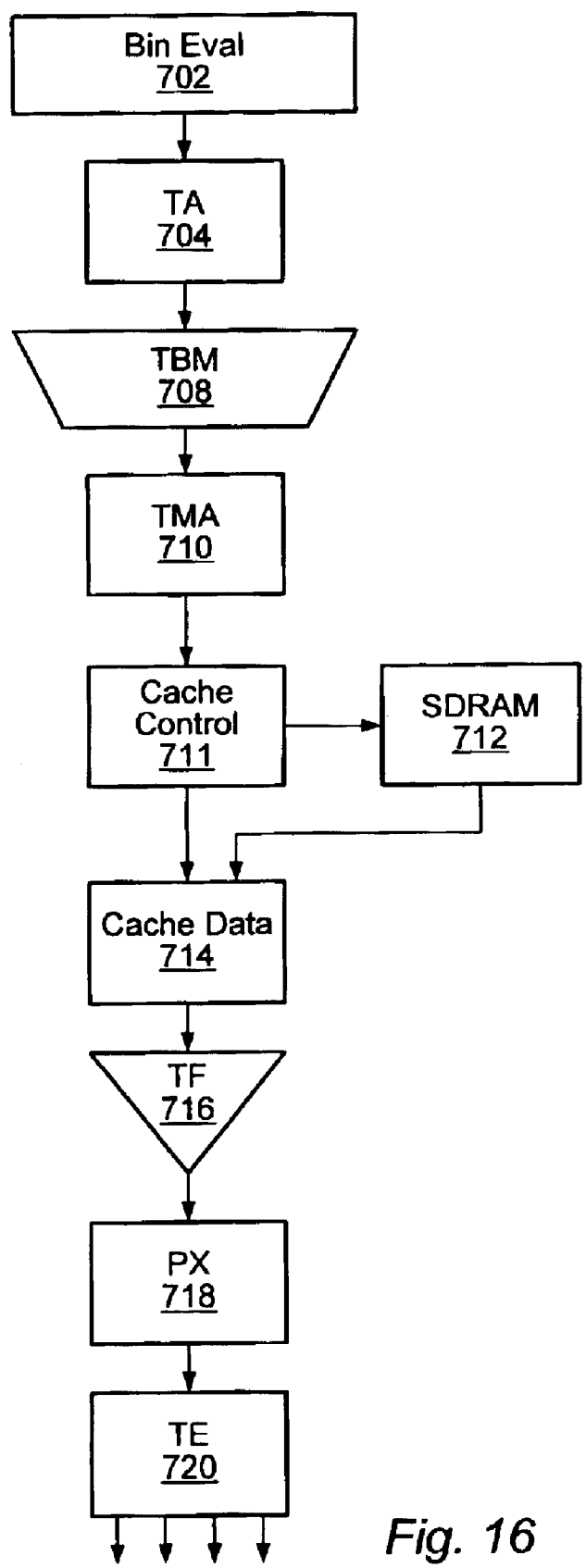
FIG. 16 illustrates a conceptual diagram of the operation of a texture mapping pipeline according to one embodiment of the invention.

FIG. 16 is a conceptual diagram that illustrates operation of a texture mapping pipeline (TMP) according to one embodiment of the invention. As shown, the TMP may include a bin evaluation element 702, which is operable to provide spatial bin information. The spatial bin information may be used by Texture Address Unit (TA) 704 to provide texel coordinate vectors, for example in a UV texel coordinate space. Each UV coordinate pair corresponds to a respective neighborhood of texel data. The texel coordinate vectors from TA 704 may then be provided to a Texture Buffer Multiplexer (TBM) 708. Texture Memory Address (TMA) unit 710 may then generate SDRAM address information for texel data based on the respective UV coordinate vectors received from TBM 708. TMA 710 may provide the SDRAM address to cache controller 711, which is coupled to SDRAM memory devices 712 from where texel data may be retrieved. Texture Cache Data 714 may be used to cache texel data in order to facilitate texel data reuse when possible. Texture Cache Data 714 may provide the requested texel data to a Texture Filter (TF) block 716, which may generate a texture value based on the corresponding texel. The texture value may then be transferred to Texture Environment (TE) 720 through Pixel Transport (PX) 718.

Figure 17:
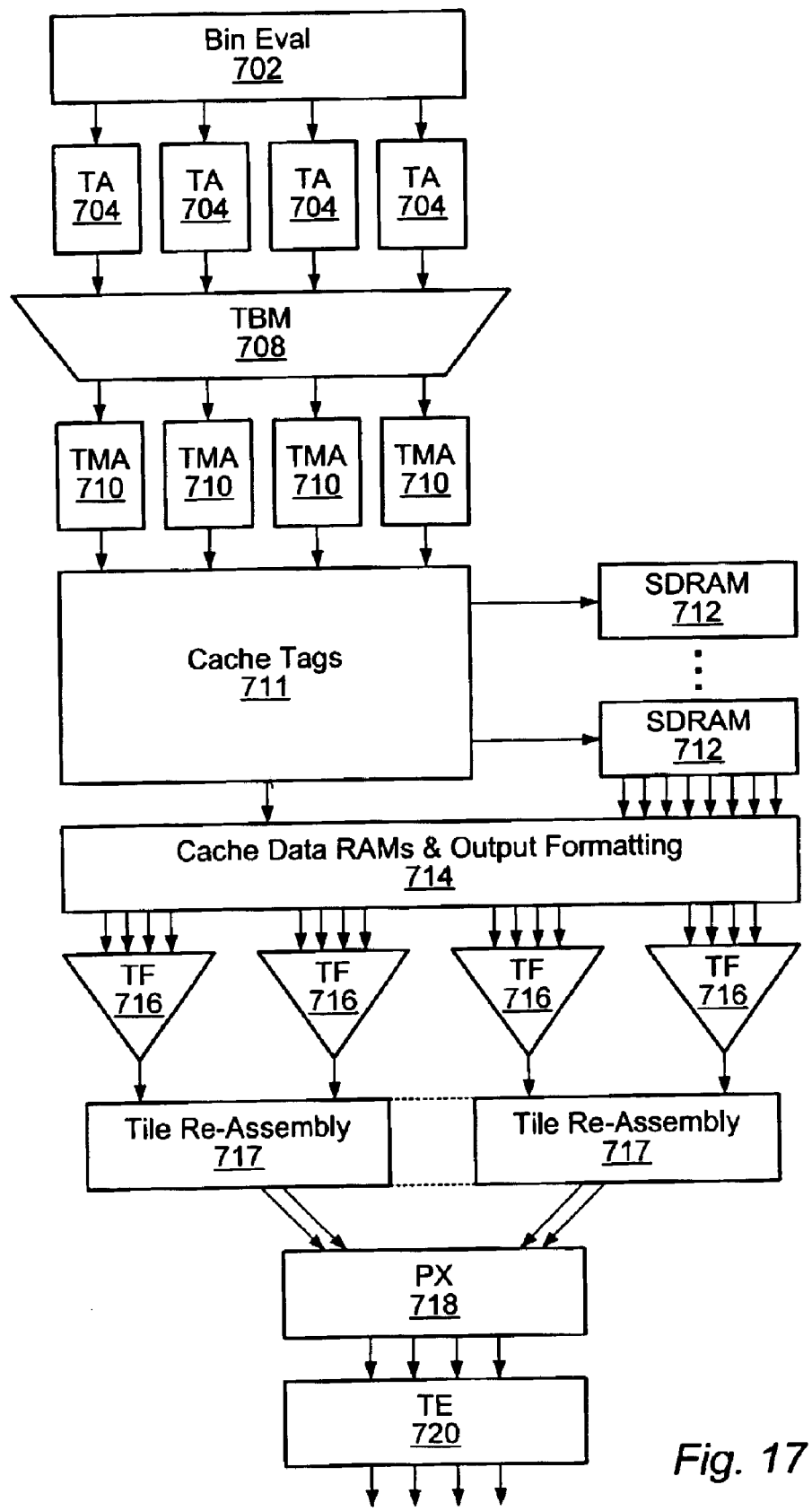
FIG. 17 illustrates a more detailed diagram of one embodiment of the texture mapping pipeline of FIG. 16, emphasizing the texture cache memory.

FIG. 17 is a more detailed diagram of one embodiment of the texture pipeline of FIG. 16, emphasizing the texture cache memory. In this embodiment, the texture cache memory has the ability to process multiple spatial bins in parallel without strict ordering or synchronization. FIG. 17 illustrates a texture pipeline with a texture cache memory constructed to operate on four spatial bins per clock cycle, with each spatial bin making a request for a respective four texels. Each respective four of the requested texels may be arranged in a 2×2 grid fashion. While FIG. 17 illustrates an embodiment in which four spatial bins are processed concurrently within a single clock cycle, alternate embodiments may implement processing less or more spatial bins within a single clock cycle. Similarly, alternate embodiments may also implement processing less or more texels per spatial bin. As shown in FIG. 17, the texture pipeline may include bin evaluation element 702 providing information about four spatial bins to four TA units 704, which in turn may provide respective texel UV coordinates for each spatial bin to TBM 708. TBM 708 may provide the respective texel UV coordinates for the four spatial bins to four TMA units 710, which generate respective SDRAM addresses based on the texel UV coordinates. The SDRAM addresses may then be used to retrieve the texel data from either SDRAM 712 or TCD 714. In one embodiment, texture cache tags 711 are separated from TCD 714. The SDRAM addresses may be used to perform a tag lookup using texture cache tags 711 without simultaneously attempting to access and retrieve data associated with the respective tag from the cache.

Texture cache tags 711 may be coupled to texture memory and memory control 712. Texture cache tag 711 may also be coupled to TCD 714. TCD 714 includes random access memory (RAM) from which texel data may be output in response to a resulting cache hit when a tag identifies requested texel data as being present in TCD 714. As shown, TCD 714 may output 4 sets of texels concurrently or in parallel. These different sets of texels may be provided to corresponding texture filters 716. Texture filters 716 each operate to filter one or more texels, and generate corresponding texture values using tile reassembly block 717. The tile reassembly blocks may then provide the corresponding texture values to TE 720 through PX 718.

As mentioned before, the texture cache may be configured to act as four parallel pipelines for processing four spatial bins in parallel, with each pipe processing a single spatial bin independently. The pipelines may operate out of sync until PX 718 is reached. Operating separate pipelines takes into account the possibility that each spatial bin may have a different filter applied to it, thus allowing different filters to be operating on different bins in parallel in a single cycle. Each bin may also take a different number of cycles to complete, e.g. some minified and some magnified. Re-synchronization of the bins may occur after TF 716 have been applied. In one embodiment TF 716 includes an output FIFO.

Figure 18:
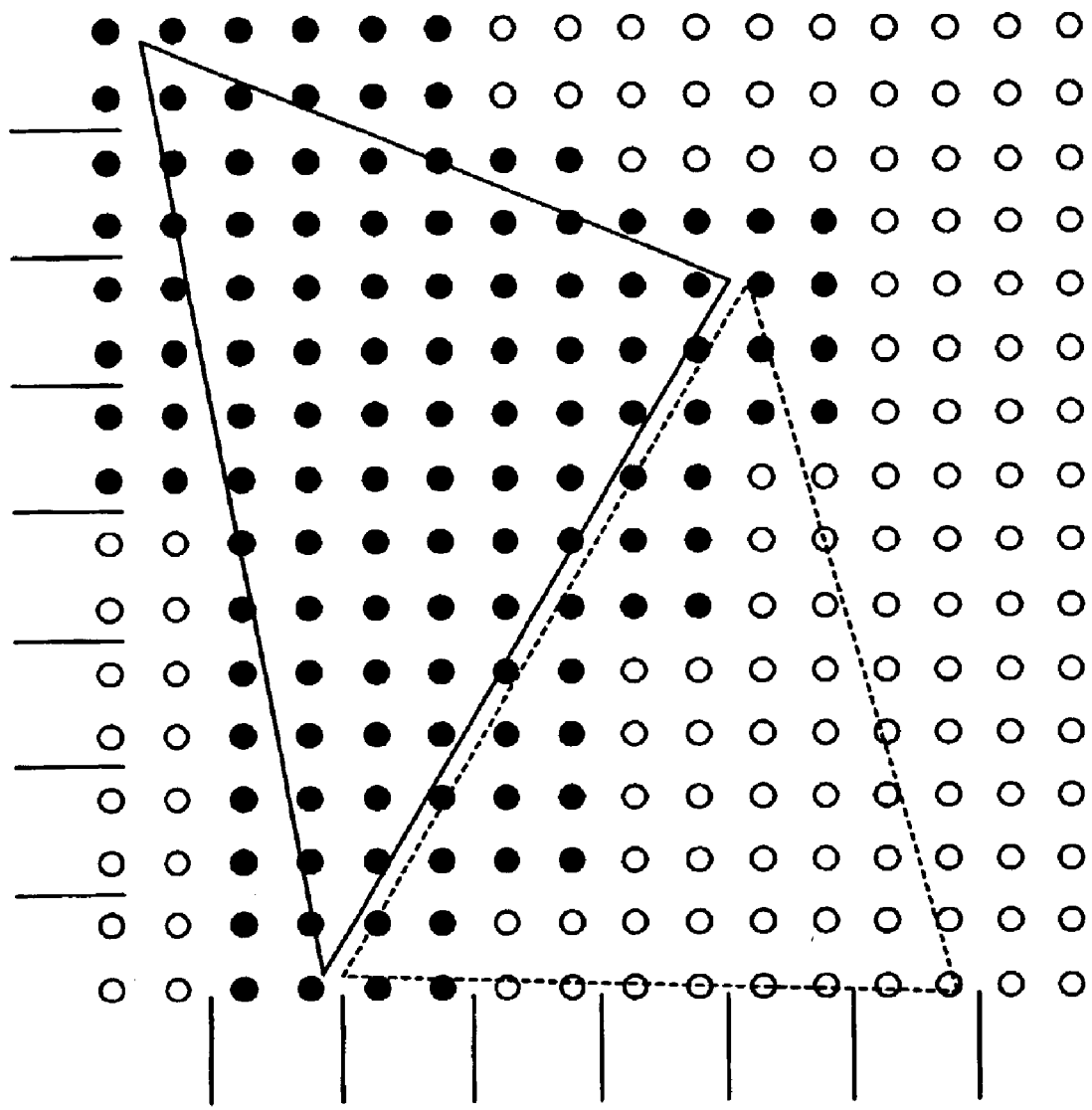
FIG. 18 illustrates an exemplary primitive and associated samples, demonstrating the concepts of texel reuse and cache size.

FIG. 18 illustrates an exemplary primitive and associated samples which demonstrates the concepts of texel reuse and cache size. In one embodiment of the invention, the cache is designed to be large enough to provide span-to-span texel reuse for medium triangles (approximately 100 pixels), and triangle-to-triangle texel reuse for small triangles (approximately 25 pixels). It should be noted that SDRAM burst reads may over-fetch data; in other words, a single burst read-request may result in excess data being returned from addresses neighboring the read-request address (the address provided with the read-request command), depending on the size of the data bus and the size of requested data. While such excess data may not be required at a time the particular burst read operation is performed, it may in fact be required at a later time. Keeping such excess data in the cache memory until it is actually needed may reduce the severity of over-fetching. This preferably applies to all multi-texture layers. Thus, over-fetching may actually be helpful for multi-texturing as it alleviates some of the cost of page misses when switching layers due to a portion of the data for the layer still being available in the cache when that layer is revisited.

Figure 19:
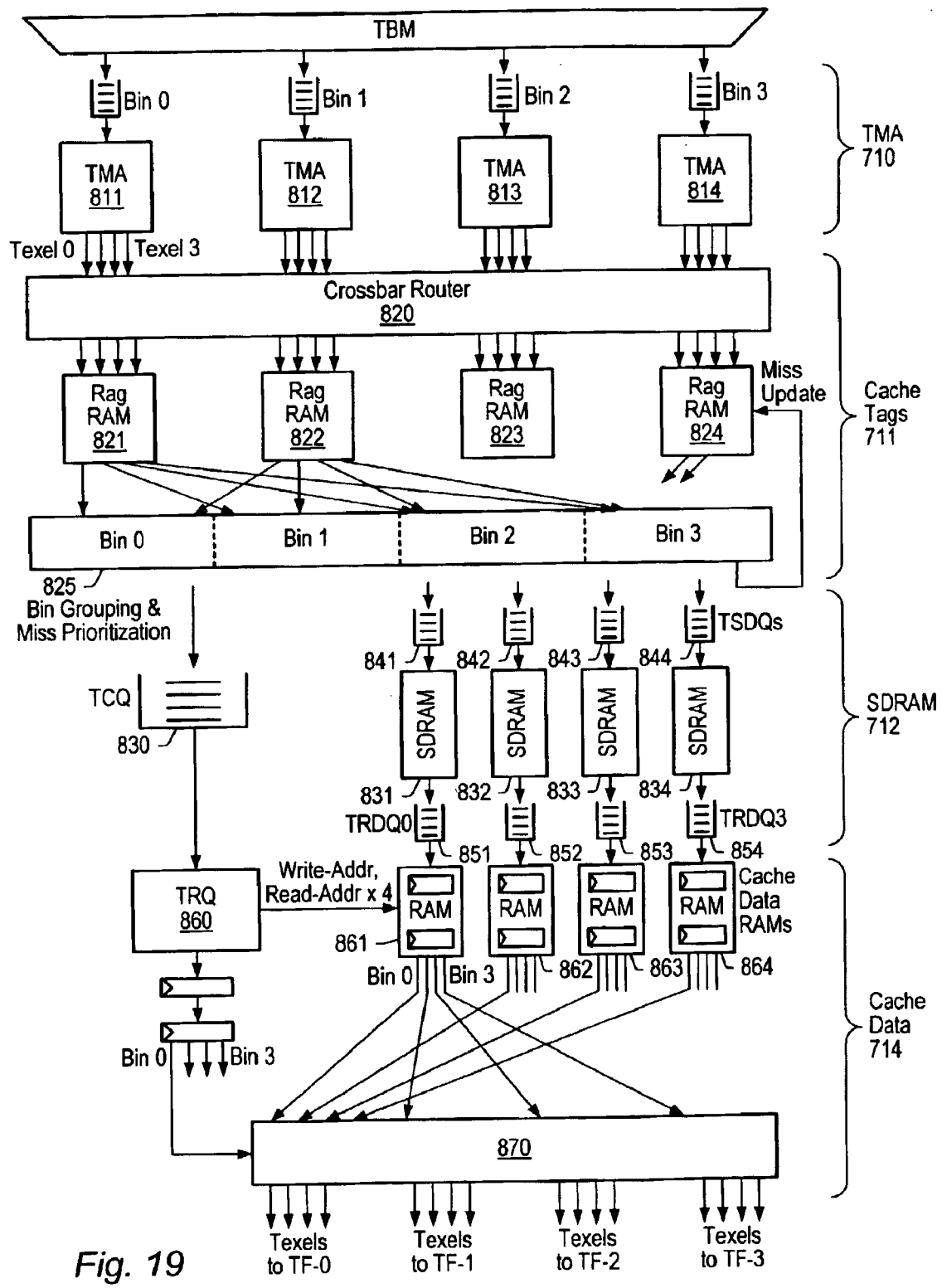
FIG. 19 illustrates in more detail a cache memory structure for the texture mapping pipeline of FIG. 17, implemented in accordance with one set of embodiments of the current invention.

FIG. 19 illustrates in more detail a cache memory structure for the texture pipeline of FIG. 17 implemented in accordance with one set of embodiments of the current invention. In one embodiment, cache tags 711 are split into four tag RAM interleave units configured to store reference information as follows:

tag RAM 1 stores reference information for even U and even V coordinates,
tag RAM 2 stores reference information for even U and odd V coordinates,
tag RAM 3 stores reference information for odd U and even V coordinates, and
tag RAM 4 stores reference information for odd U and odd V coordinates.

Each bin may provide one of four of its texel requests to each of the four tag RAM units. This produces what may be considered an evenly balanced load across all tag RAM units, where each tag RAM requires only four read-ports without any of the tag RAM units holding redundant information. Cache data 714 may also be similarly interleaved for the same reasons. The texels may be regrouped after texel data is read out of Cache Data 714. In the absence of this interleaving, a single bin may have needed entries from the same cache memory, requiring two or more clock cycles to obtain the texel data and thus causing a pipeline-stall. As illustrated in FIG. 19, four texel UV coordinates corresponding to four separate spatial bins may arrive from TBM 708 into separate TMA units 811, 812, 813, and 814. TMA units 811, 812, 813, and 814 may generate respective SDRAM addresses, which are routed by crossbar router 820 to tag RAM units 821, 822, 823, and 824. As shown, each tag RAM may take one appropriate texel request for each of the spatial bins, according to the interleaving configuration as described above. For example, tag RAM 1 may take texel requests with even U and even V coordinates for bins 0, 1, 2, and 3, tag RAM 2 may take texel requests with even U and odd V coordinates for bins 0, 1, 2, and 3, and so on.

Tag RAM units 821, 822, 823, and 824 may contain information that identifies which data is already present in Cache Data 714 and which needs to be acquired, or fetched, from SDRAM 712. If texel data requests from more than one bin result in a cache miss that requires texel data from the same SDRAM, round-robin priority may be used to determine which bin's request for texel data may be serviced first, and which bin's request may be stalled. Bin grouping and miss priority (BGMP) unit 825 may be used to make a round-robin determination as described above. BGMP 825 may also be used to regroup cache tag information for each bin. In one embodiment, the cache controller is designed to work with four memory controllers coupling to four independent SDRAM channels 831, 832, 833, and 834. Thus, the cache controller may process up to four cache misses per clock cycle, sending a possible texel data read-request for each bin to each respective memory controller. Because the bins are not interrelated, the cache controller may also give preference to cache hits, and may process them as soon as they arrive. Address information for cache misses may be stored in FIFOs 841, 842, 843, and 844 for bins 0, 1, 2, and 3, respectively. Information from tag RAM units 821, 822, 823, and 824 may be allowed to propagate to Cache Data 714 through texture control queue (TCQ) 830. TCQ 830 may be coupled to texture read queue (TRQ) 860, which may provide a write-address (for cache misses), four read-addresses (for cache hits), and hit/miss information (whether the request for texel data resulted in a cache hit or a cache miss, respectively) to each Cache Data RAM (861, 862, 863, and 864). Each Cache Data RAM may be configured to have one write-port and 4 read-ports. Data returned from SDRAM units 831, 832, 833, and 834 may be stored in FIFOs 851, 852, 853, and 854, respectively. The returned data may be written into Cache Data RAM units 861, 862, 863, and 864 from FIFOs 851, 852, 853, and 854, respectively. As shown, the texel data may be properly ordered within re-order unit 870 for each respective bin before being provided to TF units 0, 1, 2, and 3. For example, using address FIFO 841, SDRAM 831, data FIFO 851, and Cache Data RAM 861, when a texel data request for bin 0 results in a cache miss, a request for the texel data may be sent to SDRAM 831, while tag information for the request may be placed in TCQ 830 and passed on to TRQ 860. The SDRAM address for the request may be placed in FIFO 841. Once the requested texel data has been returned from SDRAM 831, it may be placed in FIFO 851, from where it may be provided directly to re-order unit 870, or written into Cache Data RAM 861.

Figure 20:
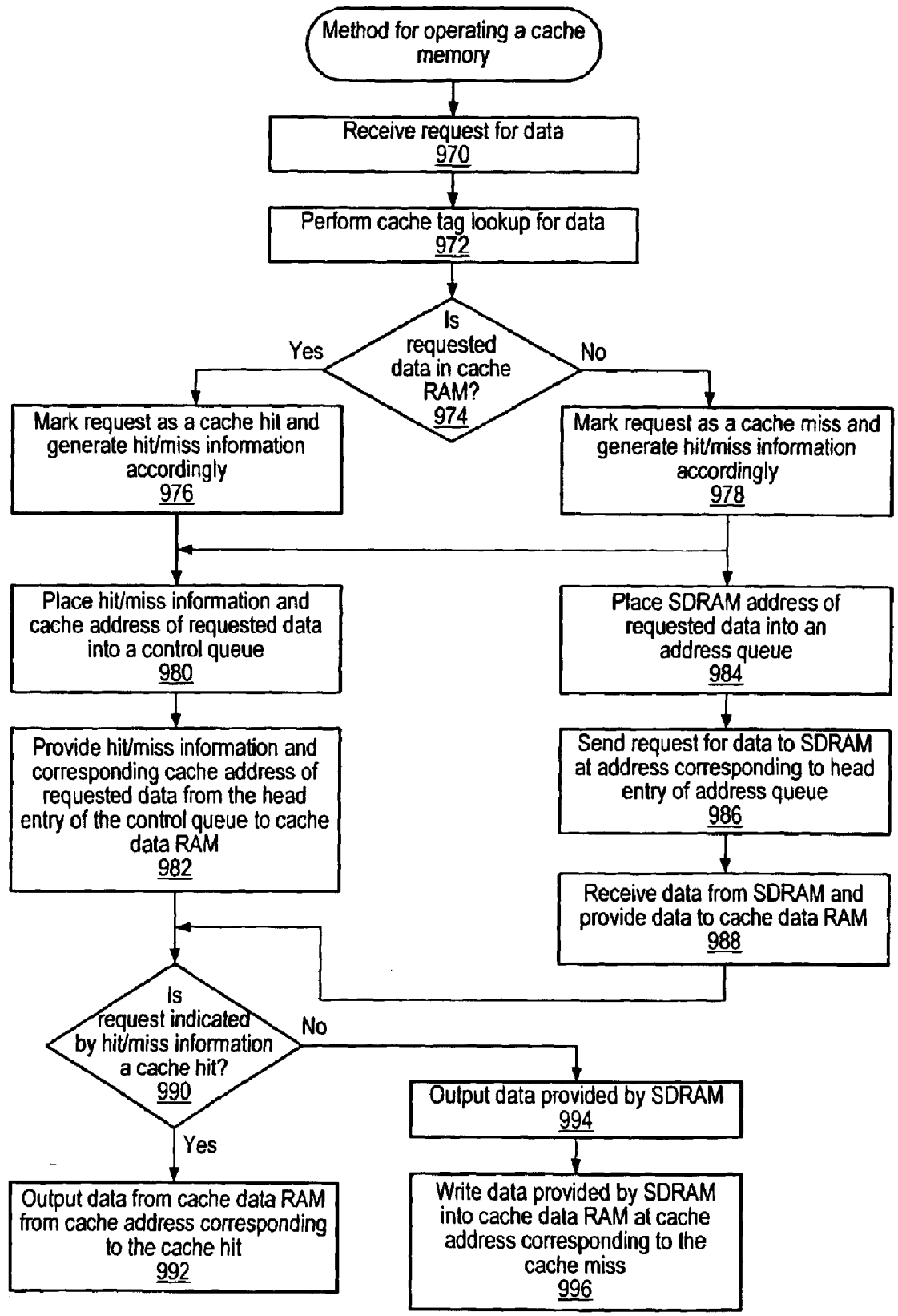
FIG. 20 illustrates a flowchart of a method for operating a cache memory, implemented in accordance with one set of embodiments of the current invention.

FIG. 20 features a flowchart of a method for operating a cache memory, which may be a texture cache memory. A request for data, which may be texel data, is received (970). A cache tag look up for the requested data may be performed (972) and a determination of whether the requested data is present in a Cache Data RAM may be made RAM (974). If the data is present in the Cache Data RAM, the request may be marked a "hit" and appropriate hit information may be generated (976). Alternately, if the requested data is not present in the Cache Data RAM, the request may be marked a "miss" and appropriate miss information may be generated (978). In one embodiment of the invention, the hit/miss information generated in 976 and 978, respectively, is stored in a control queue, along with a cache address of the respective requested data (980). In case a cache miss was determined in 974, SDRAM address of the requested data may be stored in an address queue (984). A request for data at an SDRAM address corresponding to the head address queue entry may be sent to the SDRAM (986). Data returned by the SDRAM may be received and provided to the Cache Data RAM (988). The hit/miss information and corresponding cache address of the requested data may also be provided to the Cache Data RAM from the head entry of the control queue (982). If the hit/miss information indicates a cache hit (990), data may be output from the Cache Data RAM from the cache address corresponding to the hit (992.) If the hit/miss information indicates a cache miss (990), data corresponding to the respective cache miss returned by the SDRAM may be output directly first (994), and then may be written into the Cache Data RAM at the cache address corresponding to the cache miss.

Referring now to FIG. 19, as indicated before, due to the bins not being interrelated, the cache controller may give preference to cache hits, and may process them as soon as they arrive. Following from the cache structure as illustrated in FIG. 19, in one embodiment, the cache controller may look ahead a number of cycles and may allow cache hits to be serviced prior to cache misses while texel data for the cache misses is being returned from SDRAM, due to the presence of TCQ 830, TSDQs 841, 842, 843, and 844, and TRQ 860. In such an instance, information from tag RAM units 821, 822, 823, and 824 indicating cache hits may be inserted into TCQ 830 and TRQ 860 in front of tag RAM information indicating cache misses. Extra logic may be added at the output of Cache Data 714 to re-order the appropriate bins. In other words, the bins inside the four respective pipelines may not need to be in sync, but they may be required to leave Cache Data 714 in the same order within each of the four pipelines.

Figure 21:
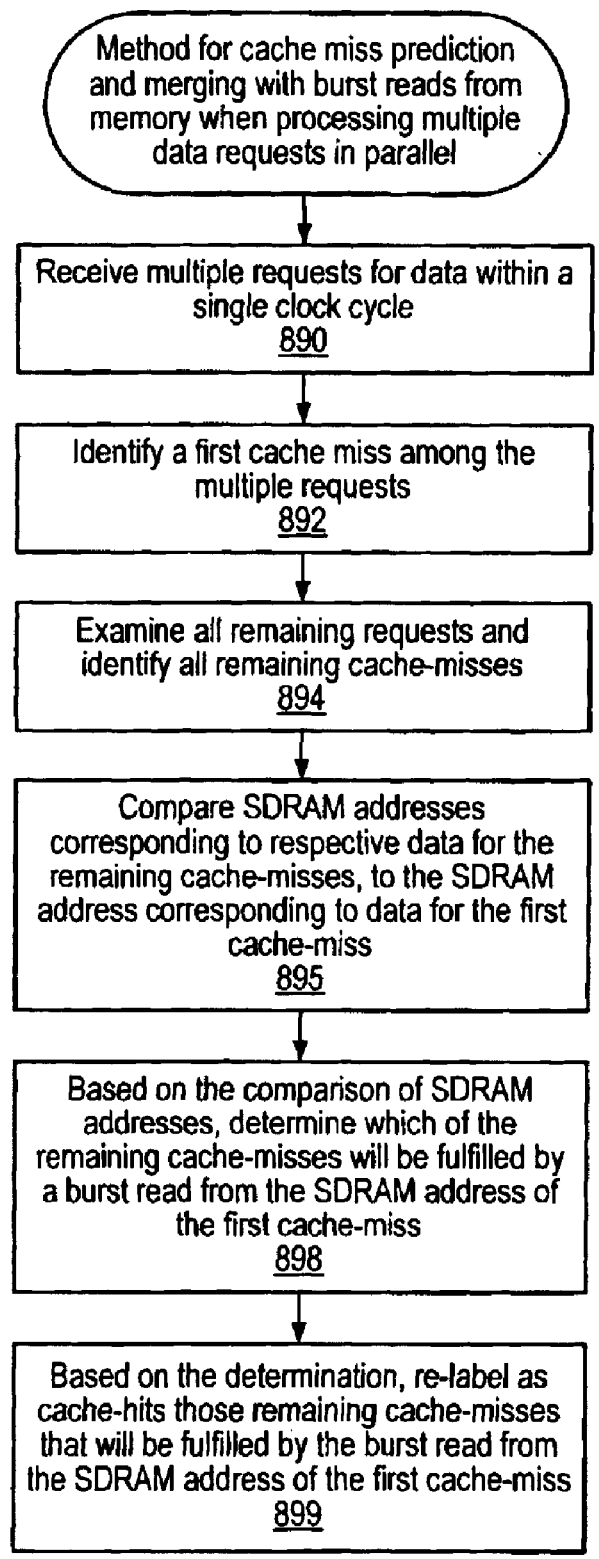
FIG. 21 illustrates part of a method for cache-miss prediction and merging with burst reads from memory, implemented in accordance with one set of embodiments of the current invention.

FIG. 21 illustrates part of a method for cache-miss prediction and merging with burst reads from memory, when processing multiple data requests in parallel. Referring to FIG. 19, memory controllers for SDRAM 831, 832, 833, and 834 may be operating at burst lengths greater than one, resulting in each SDRAM returning multiple numbers of texel data in a single read operation. This may be used to merge cache-misses, which may have miss data returned from a shared SDRAM burst read. Referring to FIG. 21, multiple requests for data may be received within a single clock cycle (890). A first cache-miss may be identified among the multiple requests that were received (892). In one embodiment, all remaining requests are examined and all remaining cache-misses among the remaining requests are identified (894). SDRAM addresses corresponding to respective data for all remaining cache-misses may be compared to the SDRAM address corresponding to data for the first cache-miss (896). Based on the comparison performed in 896, it may be determined which of the remaining cache-misses will be fulfilled (in other words, have their corresponding data returned from SDRAM) by a burst read from the SDRAM address of the data corresponding to the first cache-miss (898). In one embodiment, based on the determination performed in 898, those remaining cache-misses that will be fulfilled by the burst read described in 898 will be relabeled as cache-hits (899). The re-labeling performed in 899 may prevent extra SDRAM accesses or delays for cache tags to be updated. In other words, texel data requests by bins that result in cache-misses may take less time to ascertain when the requested texel data becomes available in the Data Cache.

Thus, various embodiments of the systems and methods described above may facilitate design of design and operation of a non-blocking cache for texture mapping. Cache Tags may be separated from Cache Data, and multiple spatial bins may be processed in parallel without strict ordering or synchronization. Separating Cache Tags and Cache Data results in a texture memory cache design that preempts stalling which would otherwise occur in case of cache-misses. In preferred embodiments the texture memory cache may also be configured to predict cache misses and merge with burst reads from memory, and may equally be configured to minimize memory read-requests necessary during multitexturing.

Although the embodiments above have been described in considerable detail, other versions are possible. Numerous variations and modifications will become apparent to those skilled in the art once the above disclosure is fully appreciated. It is intended that the following claims be interpreted to embrace all such variations and modifications. Note the section headings used herein are for organizational purposes only and are not meant to limit the description provided herein or the claims attached hereto.

What is claimed is:

1. A method for operating a cache memory, the method comprising:
   receiving a first request for first data, wherein the first request has an associated first cache tag;
   determining that the first data is not present in the cache memory by performing a tag lookup on the first cache tag;
   providing a memory request for the first data to system memory after said determining that the first data is not present in the cache memory;
   receiving a second request for second data, wherein the second request has an associated second cache tag;
   determining if the second data is present in the cache memory by performing a tag lookup on the second cache tag; and
   receiving the first data from the system memory;
   wherein at least a portion of said determining if the second data is present in the cache memory is performed prior to or concurrently with said recieving the first data from the system memory; and
   providing the second data from the cache memory if the second data is present in the cache memory is performed prior to or concurrently with said receiving the first data from the system memory as a result of determining that the first data was not present in the texture cache memory.

2. The method of claim 1, wherein the cache memory does not stall after said determining that the first data is not present in the cache memory.

3. The method of claim 1, further comprising:
   providing the second data from the cache memory if the second data is present in the cache memory;

wherein said providing the second data is performed after said receiving the first data from the system memory.

4. The method of claim 1, further comprising:
receiving a third request for third data, wherein the third request has an associated third cache tag; and
determining if the third data is present in the cache memory by performing a tag lookup on the third cache tag;
wherein at least a portion of said determining if the third data is present in the cache memory is performed prior to or concurrently with said receiving the first data from the system memory.

5. The method of claim 1, wherein the first data has an associated first
cache memory address;
the method further comprising:
storing the first cache memory address in a control queue; and
outputting the first cache memory address from the control queue concurrently with or after said receiving the first data from the system memory.

6. The method of claim 5, further comprising:
receiving a third request for third data;
wherein the third request has an associated third cache tag; and
wherein the third data has an associated third cache memory address;
determining if the third data is present in the cache memory by performing a tag lookup on the third cache tag;
providing a memory request for the third data to the system memory if the third data is not present in the cache memory;
storing the third cache memory address in the control queue; and
outputting the third cache memory address from the control queue after said outputting the first cache memory address from the control queue.

7. The method of claim 6, further comprising:
receiving the third data from the system memory if the third data is not present in the cache memory;
wherein said outputting the third cache memory address is performed concurrently with or after said receiving the third data.

8. The method of claim 6, wherein at least a portion of said determining if the third data is present in the cache memory is performed prior to or concurrently with said receiving the first data from the system memory.

9. The method of claim 5, wherein the second data has an associated second cache memory address:
the method further comprising:
storing the second cache memory address in the control queue; and
outputting the second cache memory address from the control queue after said outputting the first cache memory address from the control queue.

10. The method of claim 9, further comprising:
receiving a third request for third data;
wherein the third request has an associated third cache tag; and
wherein the third data has an associated third cache memory address;
determining if the third data is present in the cache memory by performing a tag lookup on the third cache tag;
providing a memory request for the third data to the system memory if the third data is not present in the cache memory;
storing the third cache memory address in the control queue; and
outputting the third cache memory address from the control queue after said outputting the second cache memory address from the control queue.

11. The method of claim 10, further comprising:
receiving the third data from the system memory if the third data is not present in the cache memory;
wherein said outputting the third cache memory address is performed concurrently with or after said receiving the third data.

12. The method of claim 10, wherein at least a portion of said determining if the third data is present in the cache memory is performed prior to or concurrently with said receiving the first data from the system memory.

13. The method of claim 5, wherein the control queue is a first in first out (FIFO) buffer.

14. The method of claim 1, further comprising:
generating a first flag and storing the first flag in a control queue; and
outputting the first flag from the control queue concurrently with or after said receiving the first data from the system memory;
wherein the first flag indicates that the first data is not present in the cache memory.

15. The method of claim 14, further comprising:
receiving a third request for third data, wherein the third request has an associated third cache tag;
determining if the third data is present in the cache memory by performing a tag lookup on the third cache tag;
providing a memory request for the third data to the system memory if the third data is not present in the cache memory;
generating a third flag and storing the third flag in the control queue; and
outputting the third flag from the control queue after said outputting the first flag from the control queue;
wherein the third flag indicates if the third data is present in the cache memory.

16. The method of claim 15, further comprising:
receiving the third data from the system memory if the third data is not present in the cache memory;
wherein said outputting the third flag is performed concurrently with or after said receiving the third data.

17. The method of claim 15, wherein at least a portion of said determining if the third data is present in the cache memory is performed prior to or concurrently with said receiving the first data from the system memory.

18. The method of claim 14, further comprising:
generating a second flag and storing the second flag in the control queue; and
outputting the second flag from the control queue after said outputting the first flag from the control queue;
wherein the second flag indicates if the second data is present in the cache memory.

19. The method of claim 18, further comprising:
receiving a third request for third data, wherein the third request has an associated third cache tag;
determining if the third data is present in the cache memory by performing a tag lookup on the third cache tag;

providing a memory request for the third data to the system memory if the third data is not present in the cache memory;
generating a third flag and storing the third flag in the control queue; and
outputting the third flag from the control queue after said outputting the second flag from the control queue;
wherein the third flag indicates if the third data is present in the cache memory.

20. The method of claim 19, further comprising:
receiving the third data from the system memory if the third data is not present in the cache memory;
wherein said outputting the third flag is performed concurrently with or after said receiving the third data.

21. The method of claim 19, wherein at least a portion of said determining if the third data is present in the cache memory is performed prior to or concurrently with said receiving the first data from the system memory.

22. The method of claim 19, wherein the control queue is a first in first out (FIFO) buffer.

23. The method of claim 1, wherein the first data has an associated first cache memory address;
the method further comprising:
storing the first cache memory address in a control queue;
generating a first flag and storing the first flag in the control queue;
outputting the first cache memory address from the control queue concurrently with or after said receiving the first data from the system memory; and
outputting the first flag from the control queue concurrently with or after said receiving the first data from the system memory;
wherein the first flag indicates that the first data is not present in the cache memory; and
wherein said outputting the first flag occurs concurrently with said outputting the first cache memory address.

24. The method of claim 23, further comprising:
receiving a third request for third data;
wherein the third request has an associated third cache tag; and
wherein the third data has an associated third cache memory address;
determining if the third data is present in the cache memory by performing a tag lookup on the third cache tag;
providing a memory request for the third data to system memory if the third data is not present the cache memory;
storing the third cache memory address in the address queue;
generating a third flag and storing the third flag in the control queue;
outputting the third cache memory address from the control queue after said outputting the first cache memory address from the control queue; and
outputting the third flag from the control queue after said outputting the first flag from the control queue;
wherein the third flag indicates if the third data is present in the cache memory; and
wherein said outputting the third flag occurs concurrently with said outputting the third cache memory address.

25. The method of claim 24, further comprising:
receiving the third data from the system memory if the third data is not present in the cache memory;
wherein said outputting the third cache memory address is performed concurrently with or after said receiving the third data; and
wherein said outputting the third flag is performed concurrently with or after said receiving the third data.

26. The method of claim 24, wherein at least a portion of said determining if the third data is present in the cache memory is performed prior to or concurrently with said receiving the first data from the system memory.

27. The method of claim 23, wherein the second data has an associated second cache memory address, the method further comprising:
storing the second cache memory address in the control queue;
generating a second flag and storing the second flag in the control queue;
outputting the second cache memory address from the control queue after said outputting the first cache memory address from the control queue; and
outputting the second flag from the control queue after said outputting the first flag from the control queue;
wherein the second flag indicates if the second data is present in the cache memory; and
wherein said outputting the second flag occurs concurrently with said outputting the second cache memory address.

28. The method of claim 27, further comprising:
receiving a third request for third data;
wherein the third request has an associated third cache tag; and
wherein the third data has an associated third cache memory address;
determining if the third data is present in the cache memory by performing a tag lookup on the third cache tag;
providing a memory request for the third data to the system memory if the third data is not present the cache memory;
storing the third cache memory address in the address queue;
generating a third flag and storing the third flag in the control queue;
outputting the third cache memory address from the control queue after said outputting the second cache memory address from the control queue; and
outputting the third flag from the control queue after said outputting the second flag from the control queue;
wherein the third flag indicates if the third data is present in the cache memory as determined by said performing a tag lookup on the third cache tag;
wherein said outputting the third flag occurs concurrently with said outputting the third cache memory address.

29. The method of claim 28, further comprising:
receiving the third data from the system memory if the third data is not present in the cache memory;
wherein said outputting the third cache memory address is performed concurrently with or after said receiving the third data; and
wherein said outputting the third flag is performed concurrently with or after said receiving the third data.

30. The method of claim 27, wherein at least a portion of said determining if the third data is present in the cache memory is performed prior to or concurrently with said receiving the first data from the system memory.

31. A graphics system, comprising:

a system memory which stores texture data; and a texture cache memory coupled to the system memory;

wherein the texture cache memory is operable to cache texture data that is stored in the system memory;

wherein the texture cache memory is operable to receive a first request for first data, wherein the first request has an associated first cache tag;

wherein the texture cache memory is further operable to determine if the first data is present in the cache memory by performing a tag lookup on the first cache tag;

wherein the texture cache memory is further operable to provide a memory request for the first data to system memory if the first data is not present in the cache memory;

wherein the texture cache memory is further operable to receive a second request for second data, wherein the second request has an associated second cache tag;

wherein the texture cache memory is further operable to receive the first data from the system memory;

wherein the texture cache memory is further operable to determine at least in part if the second data is present in the cache memory by performing a tag lookup on the second cache tag prior to or concurrently with receiving the first data from the system memory; and wherein the texture cache memory is further operable to provide the second data from the texture cache memory if the second data is present in the texture cache memory prior to or concurrently with receiving the first data from the system memory as a result of determining that the first data was not present in the texture cache memory.

32. The graphics system of claim 31;

wherein the texture cache memory is further operable to receive a third request for third data, wherein the third request has an associated third cache tag; and wherein the texture cache memory is further operable to determine if the third data is present in the cache memory by performing a tag lookup on the third cache tag, prior to or concurrently with receiving the first data from the system memory.

33. A graphics system comprising:

a memory for storing texture data;

a texture cache data unit for receiving texture data from the system memory; and a texture cache control unit that is operable to provide hit/miss information to the texture cache data unit that indicates if requested data is present in the texture cache data unit;

wherein the texture cache control unit is further operable to provide a first memory request for first data to the system memory and to provide a second memory request to the system memory concurrently with or prior to the first data being received by the texture cache data unit; and wherein the texture cache control unit comprises a plurality of texture cache tags and a crossbar router for receiving a texture data request comprising a plurality of texel requests from a plurality of bins and routine each one of the plurality of texel requests to a respective one of the plurality of texture cache tags.

34. The graphics system of claim 33, wherein the texture cache data unit comprises a plurality of texture cache data RAMs.

35. The graphics system of claim 34;

wherein each one of the plurality of texture cache data RAMs corresponds to a respective one of the plurality of texture cache tags.

36. The graphics system of claim 35, wherein the texture cache control unit further comprises:

a control queue coupled to each one of the plurality of texture cache data RAMs;

wherein the control queue is operable to hold the hit/miss information;

wherein the hit/miss information comprises a respective hit/miss flag corresponding to each one of the plurality of texel requests; and wherein the control queue is further operable to provide the hit/miss information to each one of the plurality of texture cache data RAMs.

37. The graphics system of claim 39;

wherein the control queue is further operable to hold a respective cache address corresponding to each one of the plurality of texel requests; and wherein the control queue is further operable to provide each respective cache address to each one of the plurality of texture cache data RAMs.

* * * * *

UNITED STATES PATENT AND TRADEMARK OFFICE
CERTIFICATE OF CORRECTION

PATENT NO. : 6,933,945 B2
DATED : August 23, 2005
INVENTOR(S) : Emberling

It is certified that error appears in the above-identified patent and that said Letters Patent is hereby corrected as shown below:

Column 22,
Line 54, please delete "recieving" and substitute -- receiving --.

Column 28,
Line 41, please delete "The graphics system of claim 39" and substitute -- The graphics system of claim 36 --.

Signed and Sealed this

Thirteenth Day of December, 2005

JON W. DUDAS
*Director of the United States Patent and Trademark Office*